United States Patent
Hattori et al.

[11] Patent Number: 6,091,927
[45] Date of Patent: Jul. 18, 2000

[54] APPARATUS AND METHOD FOR FEEDING DOCUMENTS TO AN IMAGE FORMING APPARATUS, SCANNER, OR THE LIKE

[75] Inventors: Hitoshi Hattori, Saitama; Hiroshi Fukano, Chiba; Hiroshi Kubo, Saitama; Motokazu Tamaoki, Gifu, all of Japan

[73] Assignee: Ricoh Company, Ltd., Tokyo, Japan

[21] Appl. No.: 09/192,458

[22] Filed: Nov. 16, 1998

[30] Foreign Application Priority Data

| Nov. 17, 1997 | [JP] | Japan | 9-333472 |
| Dec. 17, 1997 | [JP] | Japan | 9-347573 |
| Feb. 24, 1998 | [JP] | Japan | 10-041675 |
| Feb. 24, 1998 | [JP] | Japan | 10-041676 |
| Sep. 29, 1998 | [JP] | Japan | 10-293069 |
| Oct. 2, 1998 | [JP] | Japan | 10-281633 |

[51] Int. Cl.⁷ ............ G03G 15/00; B65H 3/08; B65H 7/08
[52] U.S. Cl. ............ 399/367; 271/126; 271/127
[58] Field of Search .................. 399/367, 371, 399/372; 271/110, 126, 127

[56] References Cited

U.S. PATENT DOCUMENTS

| 5,125,636 | 6/1992 | Higashio et al. | 399/367 X |
| 5,465,949 | 11/1995 | Yamada et al. | 271/110 |
| 5,533,721 | 7/1996 | Takashimizu | 271/126 X |
| 5,552,859 | 9/1996 | Nakagawa et al. | 271/110 X |
| 5,887,867 | 3/1999 | Takahashi et al. | 271/127 X |

FOREIGN PATENT DOCUMENTS

| 8-101460 | 4/1996 | Japan. |
| 8-268571 | 10/1996 | Japan. |
| 9-175667 | 7/1997 | Japan. |

*Primary Examiner*—Fred L. Braun
*Attorney, Agent, or Firm*—Oblon, Spivak, McClelland, Maier & Neustadt, P.C.

[57] ABSTRACT

A document feeder including an operation panel configured to receive a feed start signal and a mode of operation designation from an operator; a stacking device configured to hold a stack of documents; a sensor configured to sense the stack of documents set on the stacking device; a motor configured to raise a leading edge portion of the stack of documents to a preselected position; and a controller configured to start the motor at a time dependent on the mode of operation designated by the operator.

30 Claims, 14 Drawing Sheets

DIRECTION OF DOCUMENT FEED

6,091,927

APPARATUS AND METHOD FOR FEEDING DOCUMENTS TO AN IMAGE FORMING APPARATUS, SCANNER, OR THE LIKE

BACKGROUND OF THE INVENTION

The present invention relates to a document feeder for a copier, facsimile apparatus, scanner or similar image forming apparatus and, more particularly, to a document feeder capable of reducing the first copy time.

A document feeder is usually mounted on an image forming apparatus in order to convey a document, so that image information can be read out of the document. The document feeder includes a table to be loaded with a stack of documents, a document conveying section, and a document discharging section. The document conveying section conveys documents stacked on the table one by one to a glass platen mounted on the body of the apparatus, and then conveys each document read to the discharging section.

Japanese Patent Laid-Open Publication No. 9-166831, for example, discloses a document feeder capable of raising a table loaded with documents at the time of document feed and thereby allowing the documents to be fed by a conveying section one by one from the table. In this document feeder, as soon as the trailing edge of the last document in the direction of document feed moves away from feeding means, the document raising member is lowered. The problem with such a construction is that a document feeding operation is not allowed to start until the document raising member started to move upward reaches a preselected document feed position. The document feeder therefore increases the first copy time, i.e., a period of time necessary for the first copy to be output.

To reduce the first copy time, the document raising member may be raised as soon as document sensing means senses the documents set on the table. This, however, brings about another drawback that defective document feed is apt to occur when, e.g., the operator fails to accurately set the documents. Moreover, it is difficult for the operator to add other documents after the document raising member has been raised.

Assume that the power switch of the document feeder is turned off while document feed is under way. Then, the document raising member stops at its raised position, depending on a mechanism used to drive it. This makes it difficult for a person who turns on the power switch later to set documents unless the person performs an extra operation of lowering the document raising member. Also, if the document raising member is held in its raised position at the time of a jam, then a jamming document cannot be easily removed.

SADF (Semi Automatic Document Feeder) mode is available with the conventional document feeder for automatically feeding a document every time it is set on the table by hand. The problem with the conventional SADF mode is that when the document raising member is lowered in response to the output of the document sensing means indicative of the absence of documents, a period of time necessary for the up-down movement of the member is increased, slowing down the copying operation.

Furthermore, when thin or otherwise soft documents are fed, the last document or lower documents hang down at their leading edges in the direction of document feed. Such documents are therefore apt to fold or to jam the transport path due to defective feed. This is also true when the documents stacked on the table are curled downward (back curl).

Technologies relating to the present invention are also disclosed in, e.g., Japanese Patent Laid-Open Publication Nos. 8-101460, 8-268571, and 9-175667.

SUMMARY OF THE INVENTION

It is therefore a first object of the present invention to provide a document feeder allowing the operator to select a desired mode for raising a document raising member.

It is a second object of the present invention to provide a document feeder providing the operator with a sufficient period of time for accurately setting documents, and reducing the first copy time.

It is a third object of the present invention to provide a document feeder capable of preventing documents from dropping when the document feeder is lifted up.

It is a fourth object of the present invention to provide a document feeder enhancing easy document setting by lowering a document raising member to its lowermost position at the time of power-up.

It is a fifth object of the present invention to provide a document feeder enhancing, at the time of a jam, easy removal of a jamming document by lowering a document raising member, and facilitating document setting after the removal of the jamming document.

It is a sixth object of the present invention to provide a document feeder capable of lowering, when document sensing means determines that documents are absent, a document raising member to an intermediate position between a document feed position and a lowermost position, thereby increasing the copy speed in the SADF mode.

It is a seventh object of the present invention to provide a document feeder capable of preventing even a document with a back curl from bringing about troubles including folding when it passes through an abutment member.

It is an eighth object of the present invention to provide a document feeder including a partly replaceable abutment member.

It is a ninth object of the present invention to provide a document feeder capable of surely feeding even a soft document or a document with a back curl hanging down at its leading edge.

In accordance with the present invention, a document feeder includes an inputting section for receiving a feed start signal. A stacking section is loaded with a stack of documents. A document sensor senses the stack of documents set on the stacking section. A document raising member raises the leading edge portion of the stack of documents with respect to the direction of document feed to a preselected position. A controller controls the document raising member in response to the output of the document sensor and the feed start signal on the basis of a desired operation start timing of the document raising member selected by the operator. Also, in accordance with the present invention, a document feeder includes a stacking section to be loaded with a stack of documents. A document sensor senses the stack of documents set on the stacking section. A document raising member raises the leading edge portion of the stack of documents with respect to the direction of document feed to a preselected position where the top document contacts a pick-up member. A feeding section is connected to the stacking section for sequentially taking the documents stacked on the stacking section while feeding the documents. A conveying section is connected at one end to the feeding section for conveying each document fed from the feeding section to an image reading section for reading the document. The document raising member is lowered to a lowermost position at the time of power-up.

BRIEF DESCRIPTION OF THE DRAWINGS

The above and other objects, features and advantages of the present invention will become more apparent from the following detailed description taken with the accompanying drawings in which.

DESCRIPTION OF THE PREFERRED EMBODIMENTS

Preferred embodiments of the document feeder in accordance with the present invention will be described hereinafter.

First Embodiment

Figure 1:
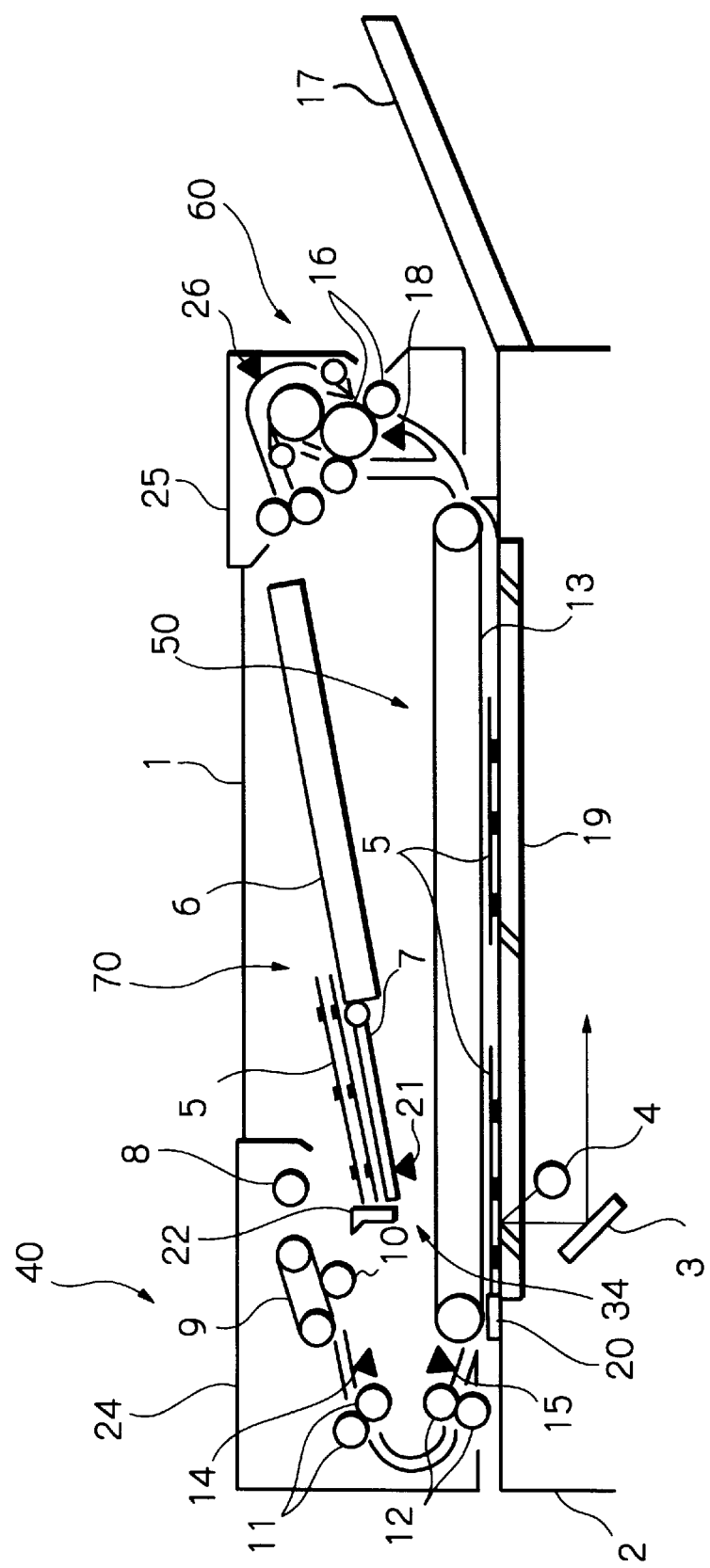
FIG. 1 shows the general construction of a document feeder shared by a first to a third embodiment of the document feeder in accordance with the present invention.

A document feeder embodying the present invention and constructed to achieve the first object will be described with reference to FIGS. 1–3. As shown in FIG. 1, a document feeder (DF hereinafter), generally 1, is mounted on a copier or similar image forming apparatus (body hereinafter) 2. The DF 1 is generally made up of a stacking section 70, a feeding section 40 including a feed/separation mechanism, a conveying section 50, and a discharging section 60. The DF 1 additionally includes inputting means, not shown, for receiving a copy start signal from the body 2 when a copy start button, not shown, provided on the body 2 is pressed.

The stacking section 70 includes a table or stacking means 6 to be loaded with a stack of documents or sheets 5. A set sensor or document sensing means 21 is responsive to the documents 5 set on the table 6. A pick-up roller or picking means 8 rests on the top document positioned on the table 6 in order to feed it from the table 6. A bottom plate or document raising means 7 raises the leading edge portion of the document stack 5 present on the table 6, so that the top document remains in contact with the pick-up roller 8. A bottom plate sensor 34 determines whether or not the leading edge portion of the bottom plate 7 in the direction of document feed is positioned at a preselected lowermost position. As shown in FIG. 3, a first feed sensor 14, a second feed sensor 15, the set sensor 21 and a lift-up up sensor 27 are connected to a CPU (Central Processing Unit) 29. The CPU 29 causes, in response to the outputs of the above sensors, a motor embodiment, the bottom plate motor 33 is implemented by a stepping motor.

The document feed section 40 includes, in addition to the pick-up roller 8, a separator belt 9, a separator roller 10, first conveyor rollers 11, and second conveyor rollers 12. The CPU 29 causes a motor driver 35a to drive the rollers 8, belt 9 and rollers 10–12 via a feed motor 30, which is also implemented by a stepping motor in the illustrative embodiment. The first sensor 14 and second sensor 15 are respectively positioned upstream and downstream of, but in the vicinity of, the first and second conveyor rollers 11 and 12 in the direction of document feed. In the illustrative embodiment, the sensors 14 and 15 are implemented by optical reflection type sensors. In FIG. 1, the reference numeral 24 generally designates a separating section.

The conveying section 50 includes a conveyor belt 13 which is an endless belt formed of rubber or cloth. The CPU 29 causes a conveyance motor 31 to drive the conveyor belt 13 via a motor driver 35b. In the illustrative embodiment, the conveyance motor 31 is also implemented by a stepping motor. The belt 13 remains in contact with a document scale 20 and a glass platen 19. When a document is brought to the belt 13 and glass platen 19 contacting each other, the belt 13 and platen 19 convey it therebetween due to a difference in the coefficient of friction between the glass 19 and document and the belt 13 and document. The document scale 20 is slightly higher in level than the upper surface of the glass platen 19. A document is caused to abut against the document scale 20 at its one edge, so that it can be read in accurate registration.

The discharging section 60 includes a tray 17 and a turning portion 25. A discharge sensor 18 is responsive to the document driven by the conveyor belt 13 and is implemented by an optical reflection type sensor in the illustrative embodiment. A turn sensor 26 is also implemented by an optical reflection type sensor. The output of the turn sensor 26 is used as a trigger for controlling the timing of a path selector, not shown, which selectively causes the document to be discharged or turned over. The CPU 29 causes a motor driver 35c to drive a discharge roller 16 via a discharge motor 32 which is implemented by a stepping motor in the illustrative embodiment. It is to be noted that the motors 30–33 are driven independently of each other.

Figure 2:
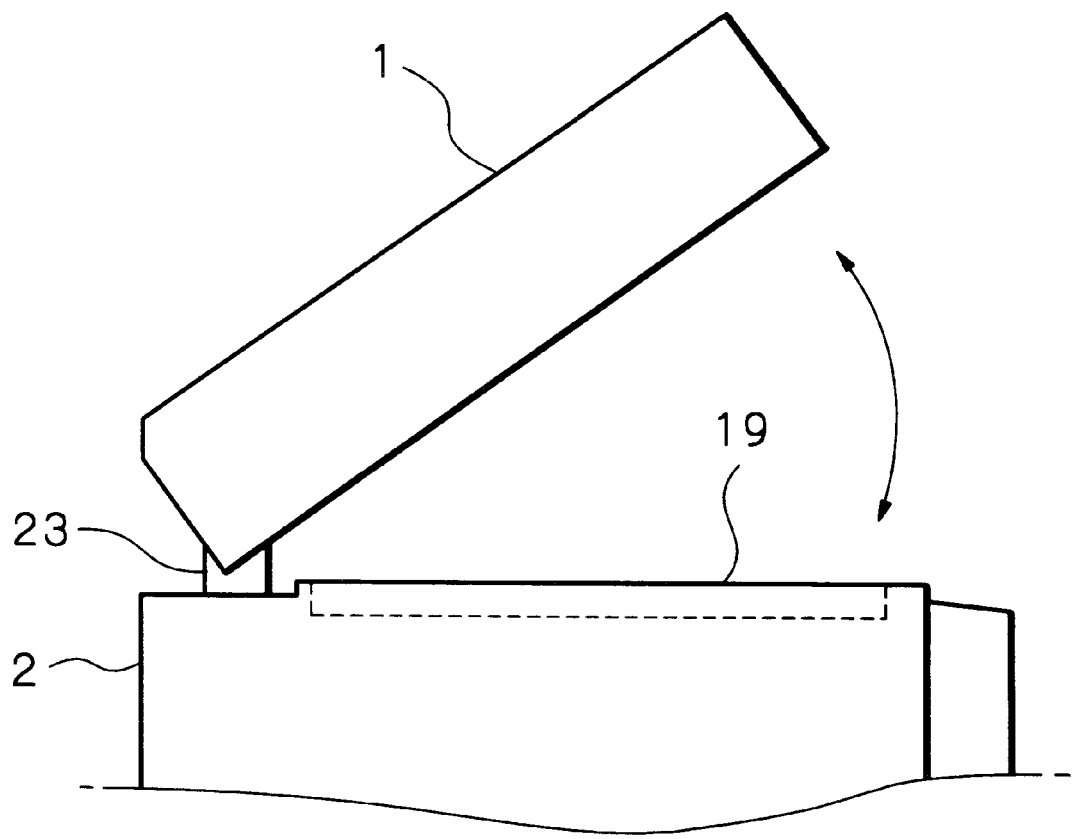
FIG. 2 shows a mechanism for lifting up the document feeder.
Figure 3:
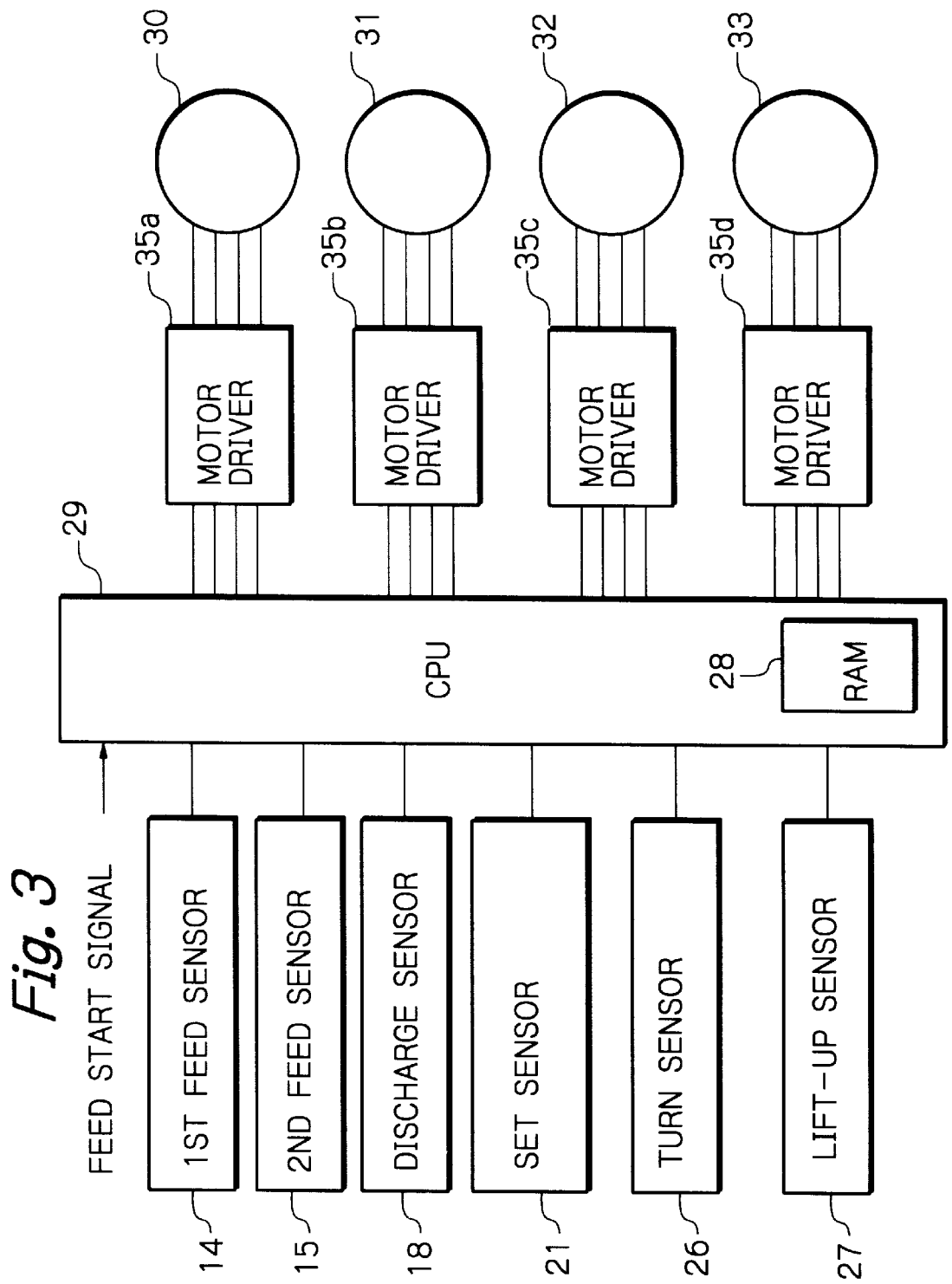
FIG. 3 is a block diagram schematically showing a control system included in the first embodiment.

As shown in FIG. 2, a hinge or similar lifting means 23 is mounted on the body 2. The lift-up sensor 27, FIG. 3, plays the role of lift-up sensing means responsive to the lift-up of the DF 1 effected via the hinge 23. For the lift-up sensor 27, use is made of an optical reflection type sensor. The CPU 29 controls the up-down movement of the bottom plate 7 in accordance with either one of a first and a second mode which will be described later specifically. The operator may select the first mode or the second mode on a mode setting section arranged on the operation panel of the body 2, although not shown specifically.

As shown in FIG. 1, the body 2 includes an exposing section in which a first mirror 3 and a lamp 4 are movable to a preselected position while scanning the document 5 positioned on the glass platen 19. Imagewise light representative of the image of the document 5 is incident to, e.g., a CCD (Charge Coupled Device) image sensor via the mirror 3. The DF 1 may be lifted up or lifted down about the hinge 23 of the body 2. The lift-up sensor 27 of the DF 1 senses the lift-up of the DF 1.

The operation of the DF 1 will be described hereinafter. The documents 5 are stacked on the table 6 and positioned by an abutment member 22 at their leading edges. When the bottom plate motor 33 is driven, it raises the bottom plate 7 in order to bring the documents 5 into pressing contact with the pick-up roller 8. When the pick-up roller 8 is caused to rotate, it pays out the top document 5 toward the separating section 24 including the separator belt 9 and separator roller 10. The first and second conveyor rollers 11 and 12 and conveyor belt 13 convey the document 5 to the glass platen 19. As soon as the document 5 is brought to a stop on the glass platen 19 with its trailing edge positioned by the document scale 20, the exposing section reads the image of the document 5 with the CCD image sensor or similar image sensor, as stated earlier.

In the illustrative embodiment, the first and second feed sensors 14 and 15 cooperate to output information representative of the length of the document 5. The information is written to a RAM (Random Access Memory) or length memory 28 (see FIG. 3) when the document 5 is stopped on the glass platen 19. Specifically, to determine the length of each document, the amount of document feed for one step of the feed motor or stepping motor 30 may be multiplied by the number of steps over which the first document sensor 14 continuously senses the document 5 at the time of document feed. If a single document is positioned on the glass platen 19, then its length is written to a first memory area of the RAM 28. If a plurality of documents pare present on the glass platen 19, their lengths are sequentially written to the consecutive memory areas of the RAM 28.

The feed motor 30 and conveyance motor 31 can be driven independently of each other, as stated previously. Therefore, the above document-by-document length scheme allows the operator to decide whether or not the next document should be fed after the discharge of the previous document from the glass platen 19 or whether or not a plurality of documents should be positioned on the glass platen 19 side by side, as desired. In addition, the operator is allowed to set up a desired distance between documents arranged on the glass platen 19 side by side. After the last document 5 has been fed from the table 6, the bottom plate 7 is lowered.

The document 5 conveyed from the glass platen 19 to the discharging section 60 is sensed by the discharge sensor 18 and driven out to the tray 17 by the discharge roller 16. Every time one document 5 is driven out to the tray 17, the lengths stored in the memory areas of the RAM 28 are sequentially shifted, e.g., the lengths stored in the second and third areas are respectively shifted to the first and second areas. The conveyance motor is a stepping motor. Therefore, the distance over which the belt 13 conveys the document 5 can be determined by, e.g., counting the pulses of the motor 31 during the conveyance of the document 5 toward the discharging section 60 and multiplying the resulting count by the amount of document feed for one step of the motor 31.

The output of the discharge sensor 18 is used to detect a jam and the delay of a document discharge timing. To detect a jam, for example, pulses being applied to the discharge motor 32 after the leading edge of the document 5 has moved away from the discharge sensor 18 are counted. The resulting count is multiplied by the amount of document feed for one step of the motor 32 in order to determine a distance over which the document 5 moved away from the sensor 18 is conveyed by the discharge roller 16. Then, the resulting product is compared with the stored length of the document 5. This procedure is successful to accurately determine the length and the distance of conveyance of the document 5 without regard to the variation of, e.g., the conveying speed. It follows that at the time of jam detection a reference for decision based on the distance of conveyance can be varied in accordance with the document size.

Figure 4:
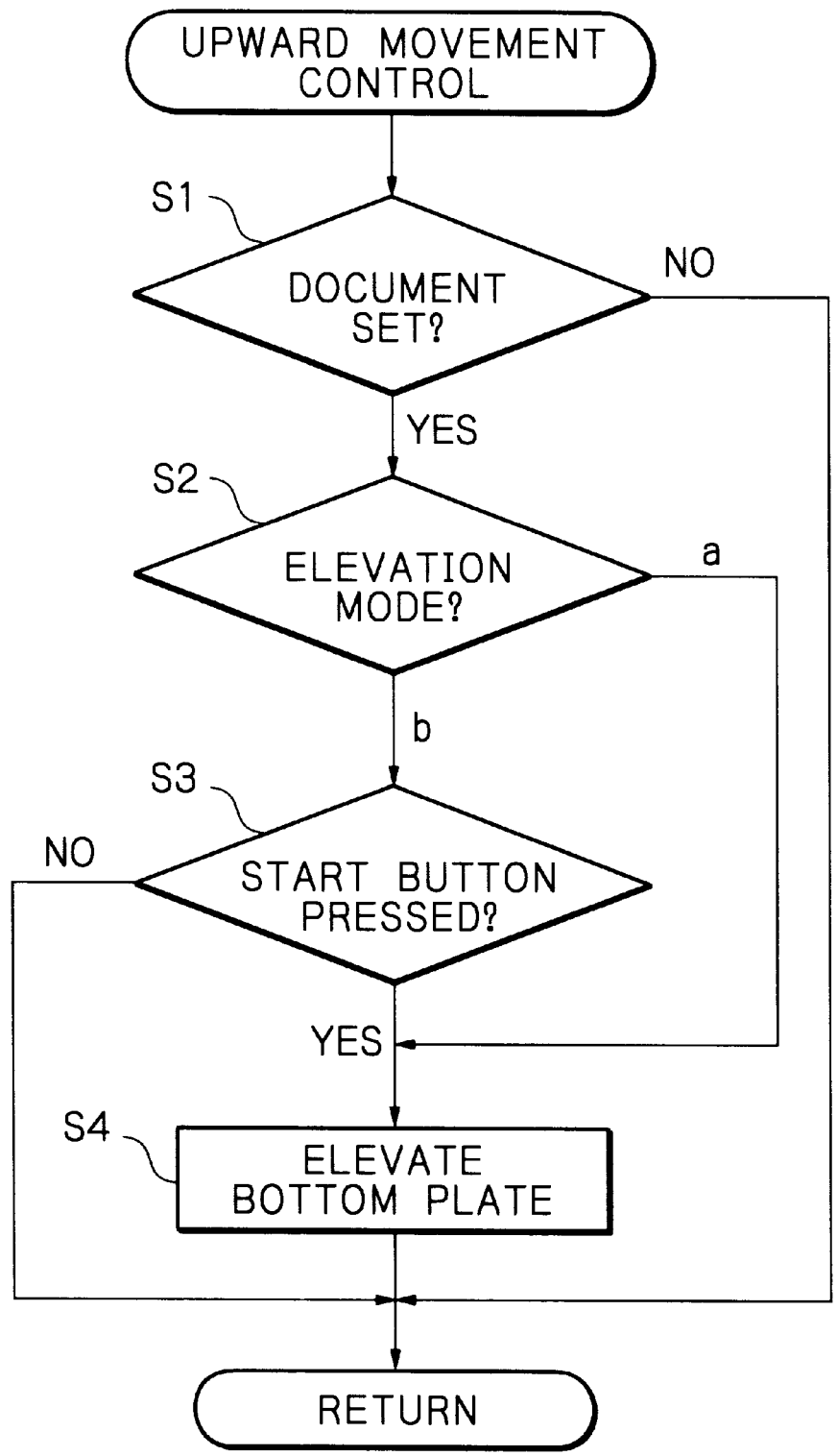
FIGS. 4–6 are flowcharts each demonstrating a particular document feed procedure available with the first embodiment.

Reference will be made to FIG. 4 for describing a first specific procedure for document feed, i.e., for control over the elevation of the bottom plate 7. In the illustrative embodiment, the previously mentioned first and second modes are available as to the elevation of the bottom plate 7 and selectively input on the operation panel of the body 2 by the operator.

Assume that the set sensor 21 senses the documents 5 stacked on the table 6 (YES, step S1), and that the first mode is selected by the operator (a, step S2). Then, just after the documents 5 have been sensed, the motor 33 is immediately driven to raise the bottom plate 7 and therefore the documents 5 (step S4). As a result, the documents 5 are pressed against the pick-up roller 8. The bottom plate 7 is held in the raised position until the operator presses the start button mentioned earlier. Therefore, the documents 5 will be immediately fed in response to a feed start signal input to the DF 1 when the operator presses the start button.

On the other hand, assume that the set sensor 21 senses the documents 5 stacked on the table 6 (YES, step S1), but the second mode is selected by the operator (b, step S2). Then, the motor 33 is not driven until the operator presses the start button. That is, only when the operator presses the start button (YES, step S3), the bottom plate 7 and therefore the documents 5 are raised to contact the pick-up roller 8 (step S4). The second mode lowers the first copy time up to the copying of the first document 5. However, the second mode allows the operator to confirm the position of the documents 5 on the table 6 and reposition them, if necessary. For example, when the edges of the documents 5 are positioned askew relative to the abutment member 22, the operator can rearrange the documents 5 to thereby obviate defective conveyance.

As stated above, the first procedure controls the up-down movement of the bottom plate 7 in either one of the first and second modes, and in addition allows the operator to select one of the two different modes on the operation panel of the body 2. The operator can therefore easily input either one of the two modes on the operation panel, causing the bottom plate 7 to be control led in the mode selected. The first mode reduces the first copy time because the bottom plate 7 rises just after the documents 6 have been sensed. The second mode allows the operator to easily rearrange the documents 5 or add other documents because the bottom plate 7 does not rise until the copy start button has been pressed.

Figure 5:
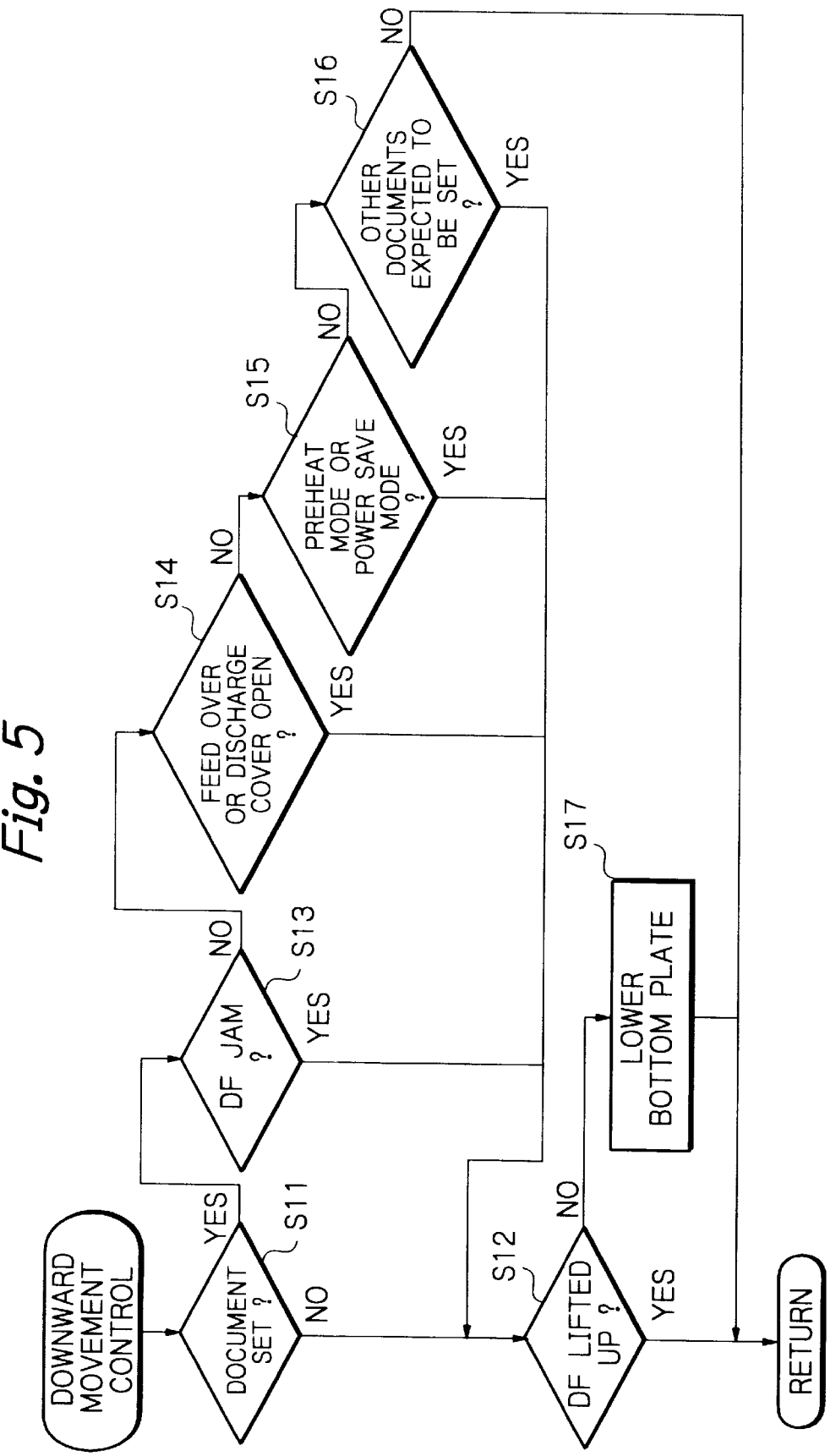

A second specific procedure will be described with reference to FIG. 5. Briefly, this procedure is such that when the DF 1 is lifted up by the operator after the elevation of the bottom plate 7 loaded with the documents 5, the downward movement of the bottom plate 7 is adequately control led. Specifically, assume that the first mode is selected, i.e., the documents 5 are set on the table 6 (YES, step S11), and the bottom plate 7 is held in its raised position. In this condition, assume that a jam occurs in the DF 1 (YES, step S13), that a document feed cover or a document discharge cover, not shown, is opened (YES, step S14), that the body 2 is brought into a preheat mode or a power save mode (YES, step S15), or that the documents 5 are expected to be rearranged (YES, step S16). Then, if the DF 1 is not lifted up (NO, step S12), the bottom plate 7 is lowered to its preselected position away from the pick-up roller 8. It is to be noted that the bottom wall 7 is also lowered when the documents 5 are removed from the table 20.

On the other hand, in the first mode, assume that the lift-up sensor 27 senses the lift-up of the DF 1 (YES, step S12) when the answer of the step S11 is NO or the answer of any one of the steps S13–S16 is YES. Then, the bottom plate 7 is prevented from being lowered away from the position where the top document 5 contacts the pick-up roller 8.

The above second procedure also allows the operator to easily select a desired mode on the operation panel. In addition, the second procedure prevents the documents 5 from dropping when the DF 1 is lifted up in the first mode.

Figure 6:
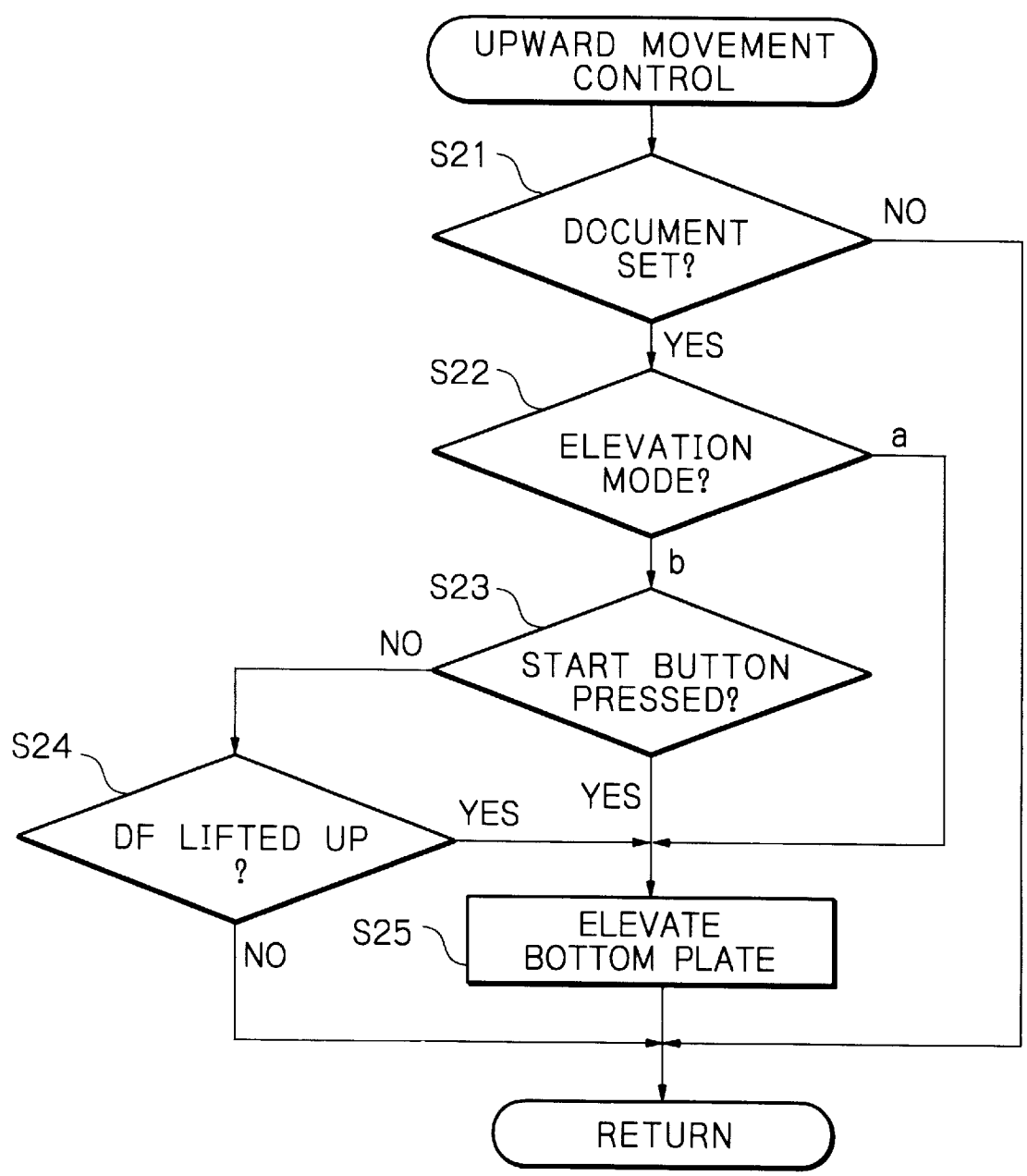

A third specific procedure will be described with reference to FIG. 6. Briefly, this procedure pertains to the second mode and is such that when the operator lifts up the DF 1 after the setting of the documents 5 on the table 6, but before the input of the feed start signal, the bottom plate 7 is raised. As shown, assume that when the second mode is selected (YES, step S21 and b, step S22), the lift-up sensor 27 senses the lift-up of the DF 1 (YES, step S24) after the sensing of the documents 5, but before the operator's operation of the start button (NO step S23). Then, the motor 33 is driven to raise the bottom plate 7 (step S25) until the documents 5 on the table 6 have been pressed against the pick-up roller 8.

The third procedure not only facilitates the operator's mode selection, but also prevents the documents 5 from dropping when the DF 1 is lifted up in the second mode.

In the illustrative embodiment, because the feed motor 30 and conveyance motor 31 can be driven independently of each other, it is possible for the operator to select a desired document feed timing or a desired document arrangement. For example, the operator can decide whether or not the next document should be fed after the discharge of the previous document from the glass platen 19 or whether or not a plurality of documents should be positioned on the glass platen 19 side by side, as desired. In addition, the operator can set up a desired distance between documents to be arranged on the glass platen 19 side by side.

Further, the motors 30–33 are implemented by stepping motors. The length of a document and the distance over which the document is conveyed can be determined on the basis of the numbers of pulses applied to the motors and the outputs of various sensors. It follows that a reference for decision based on the distance of conveyance can be varied document by document at the time of jam detection. The DF 1 is therefore adaptive to various document sizes as to jam detection.

Second Embodiment

A second embodiment to be described achieves the second and third objects mentioned earlier. The mechanical arrangement of the second embodiment is substantially identical with the arrangement shown in FIG. 1 and will not be described in detail in order to avoid redundancy.

Figure 7:
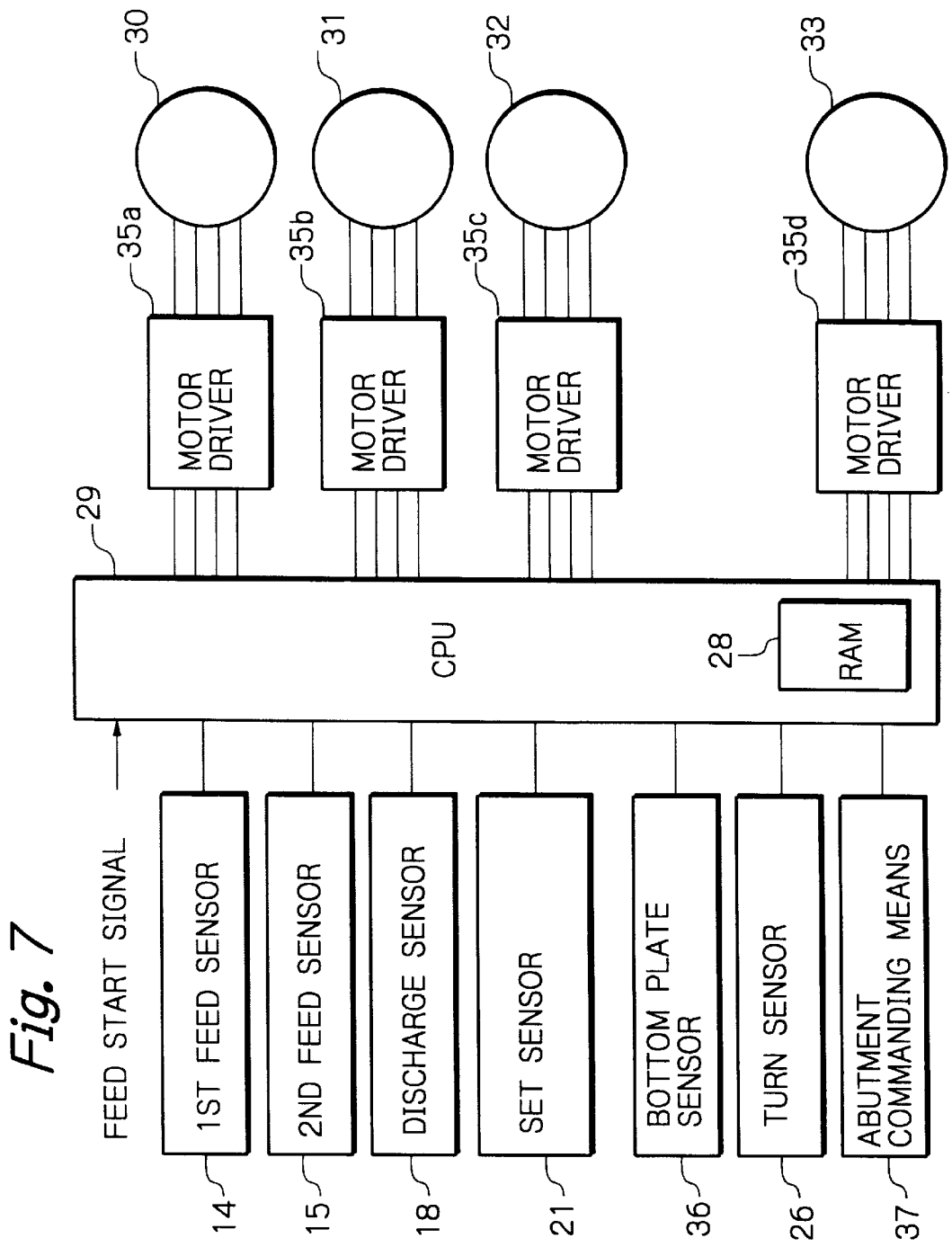
FIG. 7 is a schematic block diagram showing a control system included in the second embodiment.

As shown in FIG. 7, a control system included in the second embodiment includes a bottom plate sensor 36 and abutment commanding means 37. Referring again to FIG. 1, in the DF 1, the position of the bottom plate 7 is not definite when a power switch, not shown, provided on the body 1 is turned on. Therefore, on the power-up of the body 1, the bottom plate sensor 34 senses the position of the bottom plate 7. If the sensor 34 is in its ON state, meaning that the bottom plate 7 is held in its lowermost position, the plate 7 is not lowered. If the sensor 34 is in its OFF state, meaning that the bottom plate 7 is not located at the lowermost position, the plate 7 is lowered to the lowermost position.

Assume that the operator stacks the documents 5 on the table 6 such that the leading edges of the documents 5 contact the abutment member 22. Then, the set sensor 21 turns on and causes the bottom plate motor 33 to be driven. As a result, the bottom plate 7 is raised until the documents 5 have been pressed against the pick-up roller 8. When the pick-up roller 8 is caused to rotate, it sequentially feeds the top document to the bottom document toward the separating section 24.

The first and second conveyor rollers 11 and 12 and conveyor belt 13 included in the separating section 24 convey the document 5 to the glass platen 19. As soon as the document 5 is brought to a stop on the glass platen 19 with its trailing edge positioned by the document scale 20, the exposing section reads the image of the document 5 with the CCD image sensor or similar image sensor, as stated earlier.

In the illustrative embodiment, the first and second feed sensors 14 and 15 cooperate to output information representative of the length of the document 5. The information is written to a RAM (Random Access Memory) or length memory 28 (see FIG. 3) when the document 5 is stopped on the glass platen 19. Specifically, to determine the length of each document, the amount of document feed for one step of the feed motor or stepping motor 30 may be multiplied by the number of steps over which the first document sensor 14 continuously senses the document 5 at the time of document feed. If a single document is positioned on the glass platen 19, then its length is written to a first memory area of the RAM 28. If a plurality of documents pare present on the glass platen 19, their lengths are sequentially written to the consecutive memory areas of the RAM 28.

The feed motor 30 and conveyance motor 31 can be driven independently of each other, as stated previously. Therefore, the above document-by-document length scheme allows the operator to decide whether or not the next document should be fed after the discharge of the previous document from the glass platen 19 or whether or not a plurality of documents should be positioned on the glass platen 19 side by side, as desired. In addition, the operator is allowed to set up a desired distance between documents to be arranged on the glass platen 19 side by side. After the last document 5 has been fed from the table 6, the bottom plate 7 is lowered.

The document 5 conveyed from the glass platen 19 to the discharging section 60 is sensed by the discharge sensor 18 and driven out to the tray 17 by the discharge roller 16. Every time one document 5 is driven out to the tray 17, the lengths stored in the memory areas of the RAM 28 are sequentially shifted, e.g., the lengths stored in the second and third areas are respectively shifted to the first and second areas. The conveyance motor is a stepping motor. Therefore, the distance over which the belt 13 conveys the document 5 can be by, e.g., counting the pulses of the motor 31 during the conveyance of the document 5 toward the discharging section 60 and multiplying the resulting count by the amount of document feed for one step of the motor 31.

The output of the discharge sensor 18 is used to detect a jam and the delay of a document discharge timing. To detect a jam, for example, pulses being applied to the discharge motor 32 after the leading edge of the document 5 has moved away from the discharge sensor 18 are counted. The resulting count is multiplied by the amount of document feed for one step of the motor 32 in order to determine a distance over which the document 5 moved away from the sensor 18 is conveyed by the discharge roller 16. Then, the resulting product is compared with the stored length of the document 5. This procedure is successful to accurately determine the length and the distance of conveyance of the document 5 without regard to the variation of, e.g., the conveying speed. It follows that at the time of jam detection a reference for decision based on the distance of conveyance can be varied in accordance with the document size.

How the illustrative embodiment controls the elevation of the bottom plate 7 is as follows. As soon as the set sensor 21 senses the documents 5 stacked on the table 6, the bottom plate 7 is raised until the documents 5 have been pressed against the pick-up roller 8. In this condition, the operator may press the start button on the operation panel of the body 2. When the operator presses the start button, the pick-up roller 8 starts feeding the documents 5 immediately.

Figure 8:
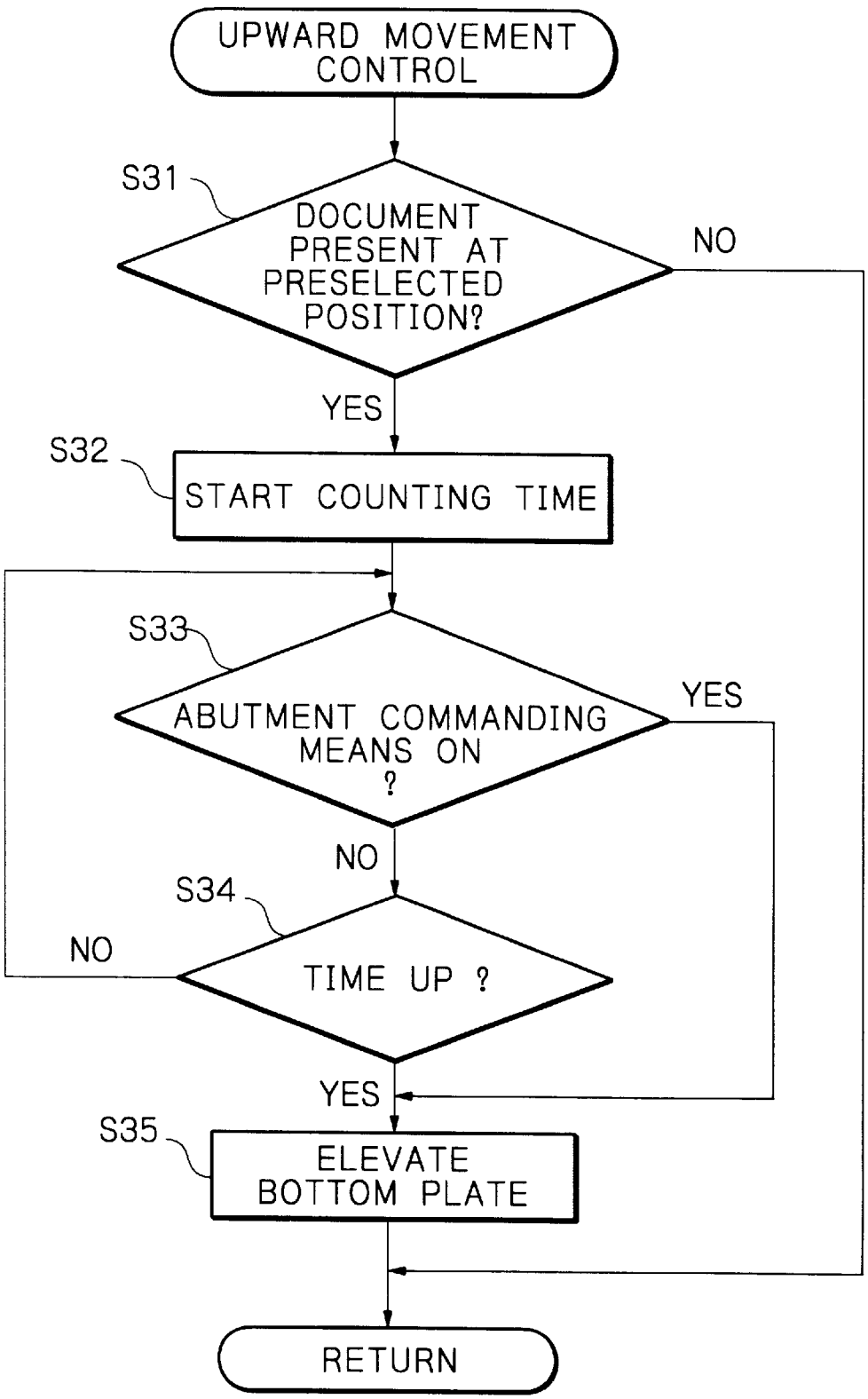
FIG. 8 is a flowchart representative of a specific operation of the second embodiment.

This embodiment allows a preselected waiting time to be set between the stacking of the documents 5 and the elevation of the bottom plate 7 or allows the operator to cause the bottom plate 7 to rise at a desired time, as will be described with reference to FIG. 8. As shown, assume that the set sensor 21 senses the documents 5 stacked on the table 6 (YES, step S31). Then, a time counting operation begins (step S32). Subsequently, whether or not the operator has input a command for causing the documents 5 to contact the abutment member 22 on the abutment commanding means 37 provided on the operation panel is determined (step S33). If the answer of the step S33 is NO, then whether or not a preselected period of time has elapsed since the beginning of the time counting operation is determined (step S34). While this period of time may be fixed, an arrangement may preferably be so made as to allow the operator to set up a desired period of time to the operator's taste or the like. If the answer of the step S34 is NO, then the program returns to the step S33. If the answer of the step S33 or the step S34 is YES, then the bottom plate 7 is elevated.

As stated above, the DF 1 waits for the operation of the start button while maintaining the paper stack 5 in contact with the pick-up roller 8. Therefore, the pick-up roller 8 can start feeding the documents as soon as the start button is pressed.

It is desirable that the document stack 5 contacts the abutment member 22 over its entire leading edge. In practice, however, it is likely that if the above fixed period of time is short, the document stack 5 is pressed against the pick-up roller 8 with its leading edge inclined relative to the abutment member 22. This, of course, brings about defective conveyance. In this sense, a sufficient interval between the sensing of the document stack 5 and the elevation of the bottom plate 7 allows the operator to easily bring the entire document stack 5 into contact with the abutment 22. Because such an interval depends on the operator, it is preferable to allow the individual operator to set a desired interval.

The abutment commanding means 37 is implemented as an input section provided on the operation panel of the body 2 and allows the operator to cause the bottom plate 7 to rise at a desired time. The operator can therefore stack the documents 5 on the table 6, accurately abut the documents 5 against the abutment member 22, and then input a command for raising the bottom plate 7 on the abutment commanding means 37. That is, the operator can accurately abut the documents 5 against the abutment member 22 at the operator's own pace. Just after the operator presses the start button, the DF 1 starts feeding the documents 5.

As stated above, in the illustrative embodiment, the DF 1 raises the bottom plate or document raising member 7 as soon as the set sensor or document sensing means 21 senses the documents 5. The DF 1 therefore starts feeding the documents 5 as soon as the operator presses the start button. This successfully reduces the first copy time. Alternatively, the DF 1 may raise the bottom plate on the elapse of a preselected period of time, e.g., 1 second after the sensor 21 has sensed the documents 5. The preselected period of time allows the operator to accurately set the documents 5 at a preselected position, so that desirable document setting is promoted. Further, the operator may set any desired period of time, which is not excessively long, on the time setting means.

In addition, the operator can input a command for raising the bottom plate 7 on the abutment commanding means as soon as the documents 5 are set on the table 6. This allows any operator to accurately position the documents 5 at a preselected position at the operator's own pace.

Third Embodiment

A third embodiment to be described achieves the fourth to sixth objects mentioned earlier. The mechanical arrangement of the second embodiment is substantially identical with the arrangement shown in FIG. 1 and will not be described in detail in order to avoid redundancy.

Figure 9:
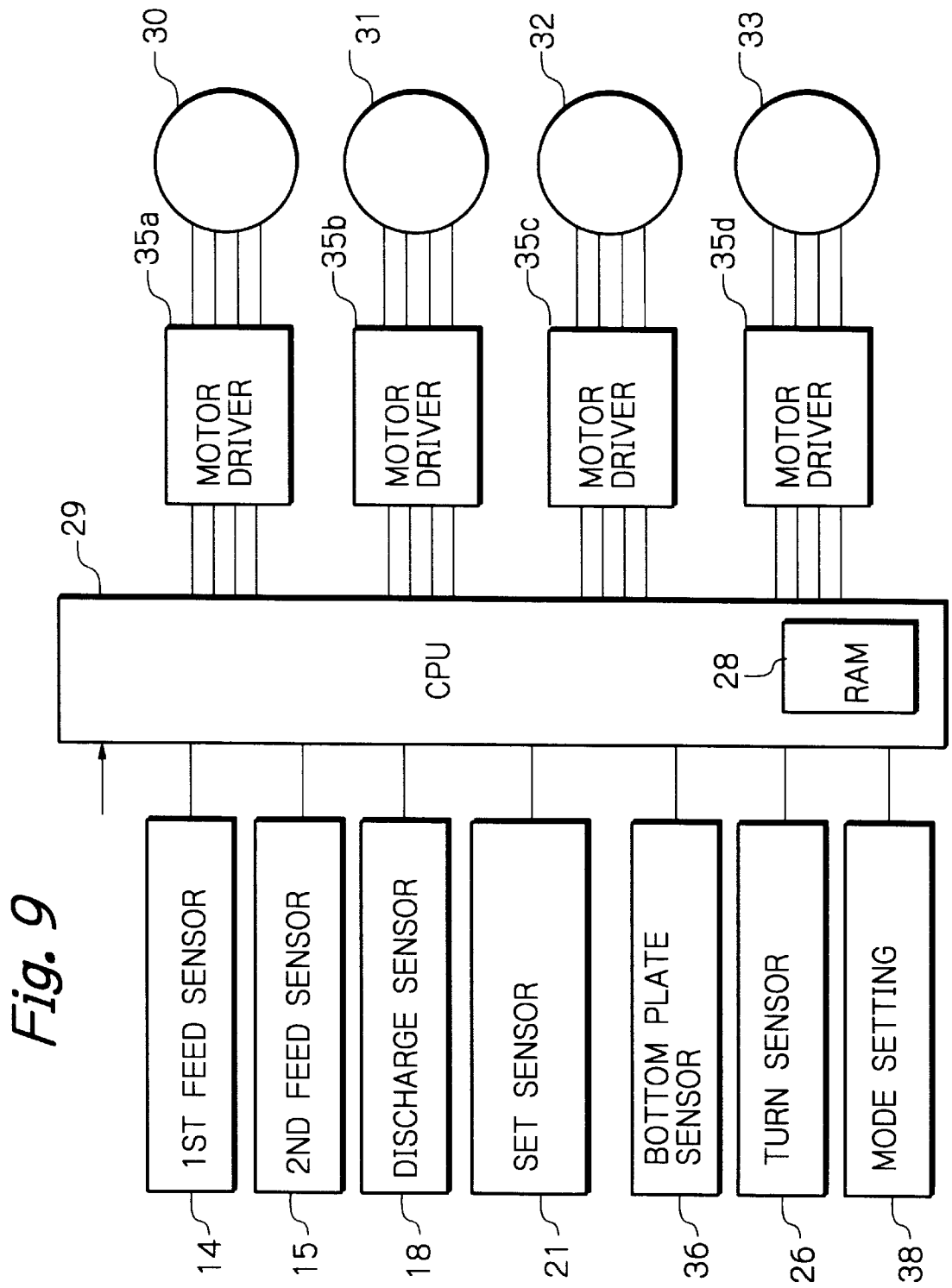
FIG. 9 is a schematic block diagram showing a control system included in the third embodiment.

As shown in FIG. 9, a control system included in the third embodiment includes a mode setting 38 implemented by, e.g., a switch provided on the operation panel of the body 2. The mode setting 38 constitutes mode setting means in combination with the CPU 29. The mode setting 38 allows the operator to select either one of an ADF (Automatic Document Feeder) mode or standard mode and an SADF (Semi Automatic Document Feeder) mode. In the ADF mode, the DF 1 sequentially feeds the documents 5 stacked on the table 6 one by one. In the SADF mode, every time the operator sets one document 5 on the table 6, the DF 1 feeds it automatically. In each of the ADF and SADF modes, the CPU 29 controls the up-down movement of the bottom plate 7 in a particular manner. The operator may select the SADF mode in order to prevent the simultaneous feed of two or more documents 5 or to protect the documents 5 from contamination by way of example. Specifically, in the SADF mode, the DF 1 automatically feeds the second and successive documents 5 only if the operator sets them on the table 6 one by one without pressing the start button.

The basic operation of the illustrative embodiment is essentially similar to the operation described in relation to the first and second embodiments. The following description will concentrate on the document feeding method, i.e., control over the drive of the bottom plate 7.

Figure 10:
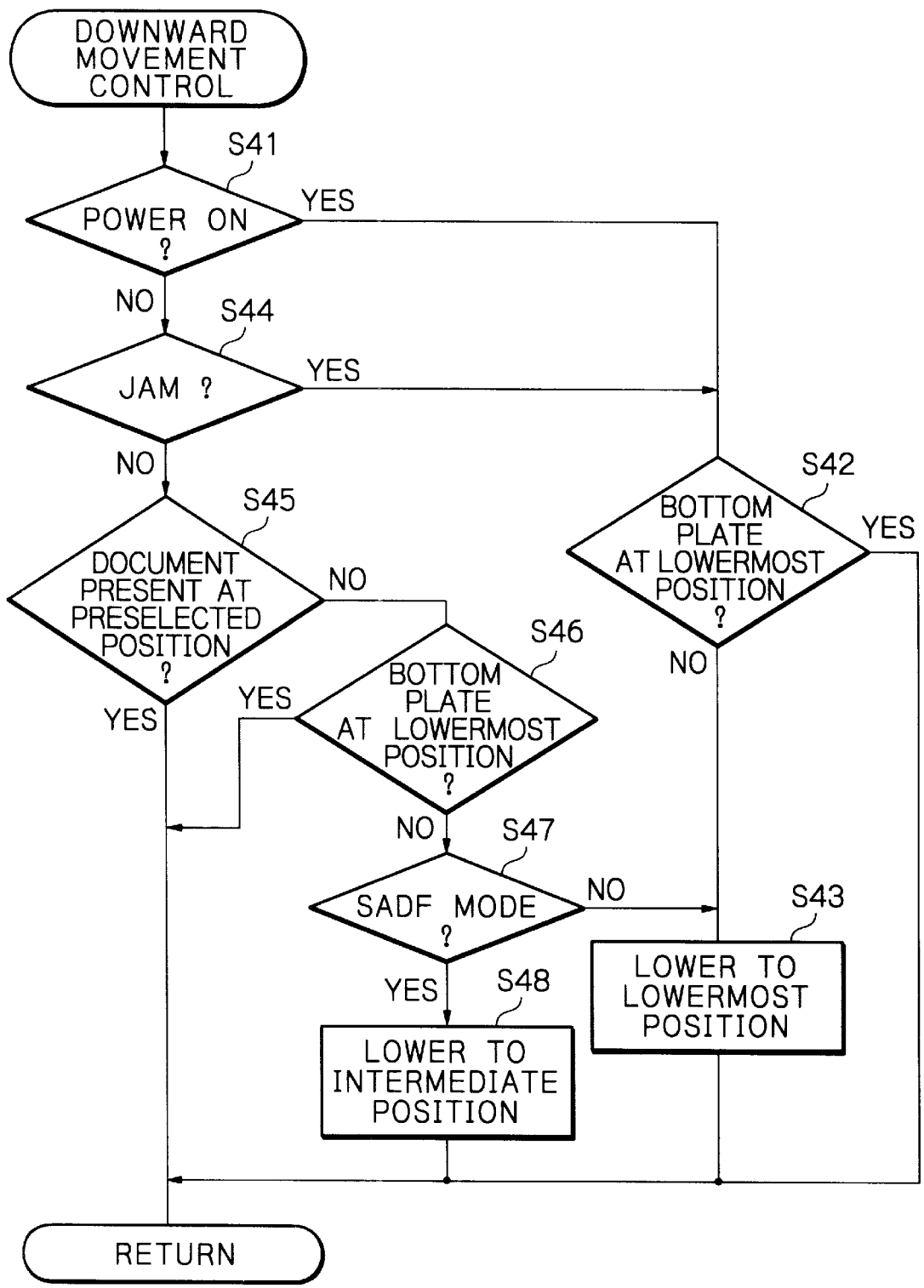
FIG. 10 is a flowchart representative of a specific operation of the third embodiment.

First, reference will be made to FIG. 10 for describing the control over the downward movement of the bottom plate 7. The position of the bottom plate 7 is not definite when a power switch, not shown, provided on the body 1 is turned on. Therefore, on the power-up of the body 1 (YES, step S41), the bottom plate sensor 34 senses the position of the bottom plate 7. If the sensor 34 is in its ON state (YES, step S42), meaning that the bottom plate 7 is held in its lowermost position, the plate 7 is not lowered. If the sensor 34 is in its OFF state (NO, step S42), meaning that the bottom plate 7 is not located at the lowermost position, the plate 7 is lowered to the lowermost position (step S43). This locates the bottom plate 7 at the lowermost position at the time of power-up without fail. The operator can therefore surely abut the documents 5 against the abutment member 22 when setting them on the table 6.

If the answer of the step S41 is NO, meaning that the power switch has already been turned on, a step S44 is executed because the bottom plate 7 has already been brought to the lowermost position. In the step S44, whether or not a jam has occurred is determined on the basis of the outputs of the sensors 14, 15 and 18 while the document 5 is in conveyance. If the answer of the step S44 is YES, the step S42 is executed. If the answer of the step S44 is NO, whether or not any other document 5 is present on the table 6 is determined on the basis of the output of the set sensor 21 (step S45).

If the answer of the step S45 is YES, the operation returns. If the answer of the step S45 is NO, whether or not the bottom plate 7 is located at the lowermost position is determined by the bottom plate sensor 36 (step S46). If the answer of the step S46 is YES, the operation returns; if otherwise, (NO, step S46), whether or not the SADF mode is set is determined (step S47).

In the step S47, the content input on the mode setting 38 is confirmed. If the answer of the step S47 is NO, the bottom plate 7 lowered to the lowermost position where the bottom plate sensor 36 turns on (step S48). If the answer of the step S47 is YES, the bottom plate 7 is lowered to an intermediate position or SADF position between the document feed position and the lowermost position. For this purpose, the CPU 29 drives the bottom plate motor 33 by a preselected number of pulses. The intermediate position or SADF position refers to a position where a single document set on the table 6 can be surely abut against the abutment member 22. This makes it needless to lower the bottom plate 7 to the lowermost position each time of document feed and thereby increases the copy speed.

As stated above, in the illustrative embodiment the DF 1 lowers the bottom plate or document raising member 7 to the lowermost position without fail every time the power switch is turned on, allowing the operator to surely set the documents. In addition, when a jam is detected, the bottom plate 7 is lowered to the lowermost position. This not only facilitates the removal of a jamming document, but also enhances accurate setting of documents after the removal of the jamming document.

Further, in the ADF mode, the bottom plate 7 is lowered to the lowermost position when the document sensor or document detecting means 21 determines that documents are absent. In the SADF mode, when documents are absent, as determined by the sensor 21, the bottom plate 21 is lowered to the intermediate position between the document feed position and the lowermost position. This successfully increases the copy speed in the SADF mode.

Fourth Embodiment

This embodiment is constructed to achieve the seventh to ninth objects mentioned earlier. To better understand this embodiment, brief reference will be made to a conventional DF, shown in FIG. 11. As shown, the DF raises the leading edge portion of a document stack and causes a pick-up roller 107 to pay out the top document. Two different document feed systems are known in the art, as follows. In one system, while the pick-up roller 107 and bottom plate 103 nip the leading edge portion of the document stack, the pick-up roller 107 is rotated to feed the top document first. In the other system, while the pick-up roller 107 rests on the top of the document stack due to its own weight, the bottom plate 103 holing the document stack between it and the pick-up roller 107 is raised until an adequate position for feeding the top sheet has been detected. Then, the pick-up roller 107 is rotated in order to pay out the top sheet due to its own weight.

In the above DF, a gap exists between the bottom plate 103 and an abutment surface 129C included in an abutment member, i.e., a part of a stay 129. The problem is therefore that the leading edge portion of the last document or lower documents tend to hangs down into the above gap when the documents are thin or soft. The documents in such a condition cannot get over the abutment member and are apt to fold themselves or jam the transport path. This problem also arises when the documents originally have a back curl, i.e., they curl downward when set on the table.

Figure 11:
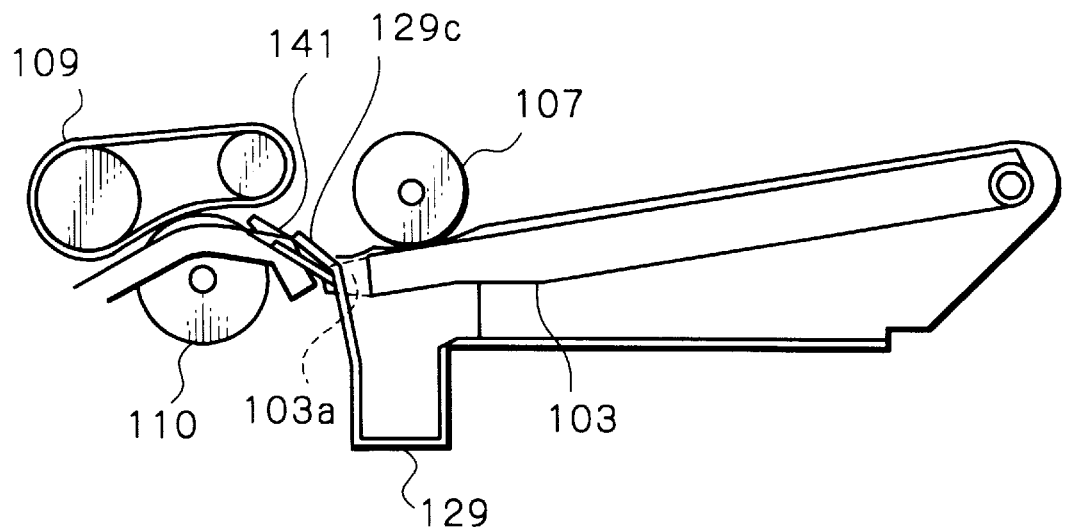
FIG. 11 is a view showing a conventional document feeder.

In light of the above, there has been proposed a DF in which a part of the bottom plate 103 extends forward over the abutment member, as indicated by a dashed line 103a in FIG. 11. The extension 103a of the bottom plate 103 covers the gap between the bottom plate 103 and the abutment member. In this case, the abutment surface 129C guides the document being transferred from the bottom plate 103 to an upper document guide 141. The document is further fed to a belt 109 and conveyed thereby in the direction of document feed. At this instant, a reverse roller 110 rotates in the direction opposite to the direction of document feed in order to separate the above document from the underlying documents. This kind of DF is taught in, e.g., Japanese Patent Laid-Open Publication No. 9-325531.

Figure 12A:
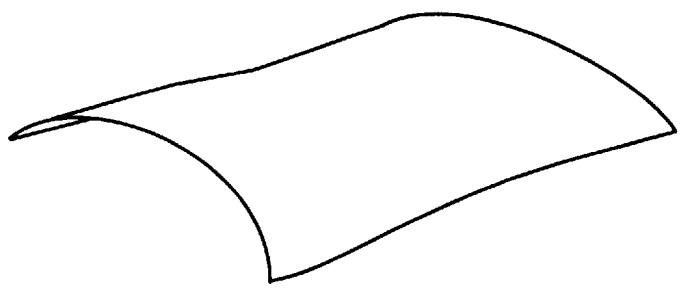
FIGS. 12A and 12B each shows a specific document with a back curl.
Figure 12B:
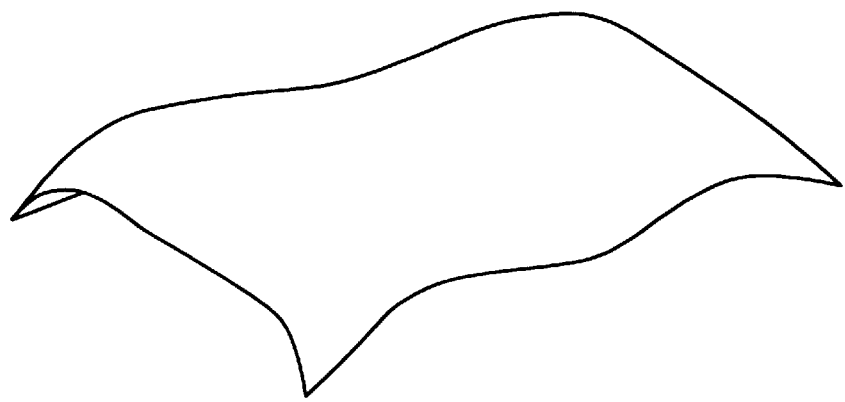

The DF including the extension 103a of the bottom plate 103 successfully prevents thin or soft documents or documents with a back curl from entering the gap between the bottom plate 103 and the abutment member. However, such a DF does not give sufficient consideration to documents with a back curl tending to hang down at opposite side edges with respect to the direction of document feed. Specifically, FIG. 12A shows a document whose edge to abut against the abutment surface 129C hangs down at opposite side edge portions from the center. FIG. 12B shows a document not only curled in the same manner as the document of FIG. 12A, but also curled in the direction of document feed in a waving fashion.

The documents shown in FIGS. 12A and 12B each is apt to fold itself at the opposite side edges when contacting the abutment surface 129C. Specifically, when the document shown in FIGS. 12A or 12B is set on the table, the center portion of the document can get over the abutment surface 129C because it is straightened by a pressure acting between the pick-up roller 107 and the bottom plate 103 or the weight of the pick-up roller 107. However, the opposite side edge portions of the document hang down due to the back curl and cannot easily get over the abutment surface 129C.

Figure 13:
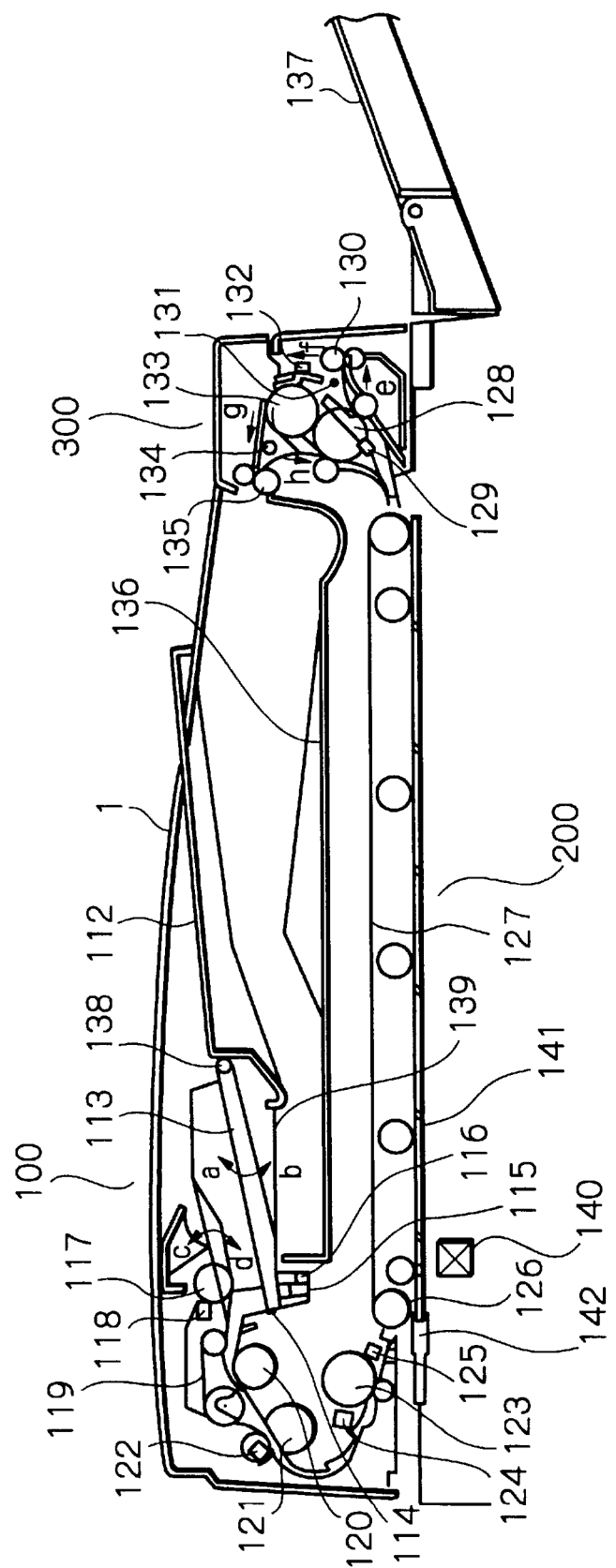
FIG. 13 shows a fourth embodiment of the document feeder in accordance with the present invention.

The fourth embodiment capable of solving the above problem will be described with reference to FIG. 13. As shown, a DF 1 is mounted on the body of a copier and generally made up of a feeding section 100, a conveying section 200, and a discharging section 300. These sections 100, 200 and 300 each is driven by a respective drive means not shown.

Figure 14:
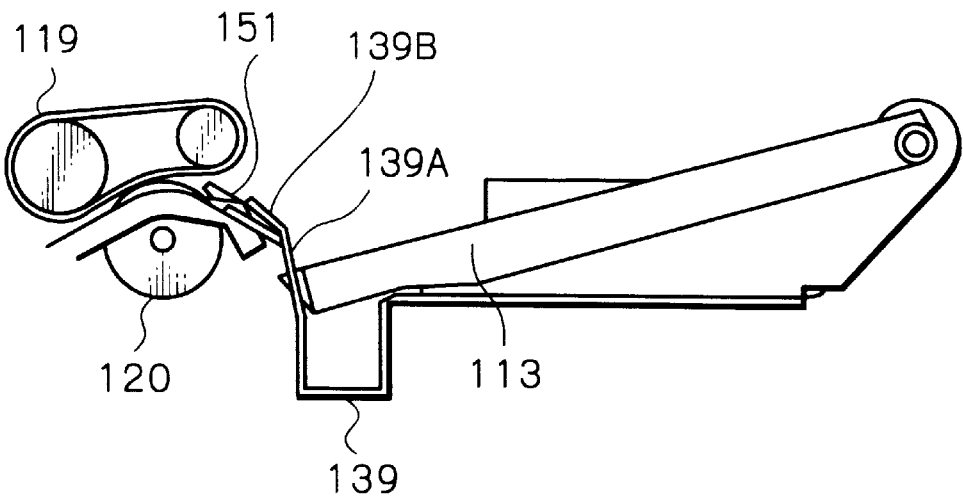
FIG. 14 shows a document setting section included in the fourth embodiment.
Figure 15:
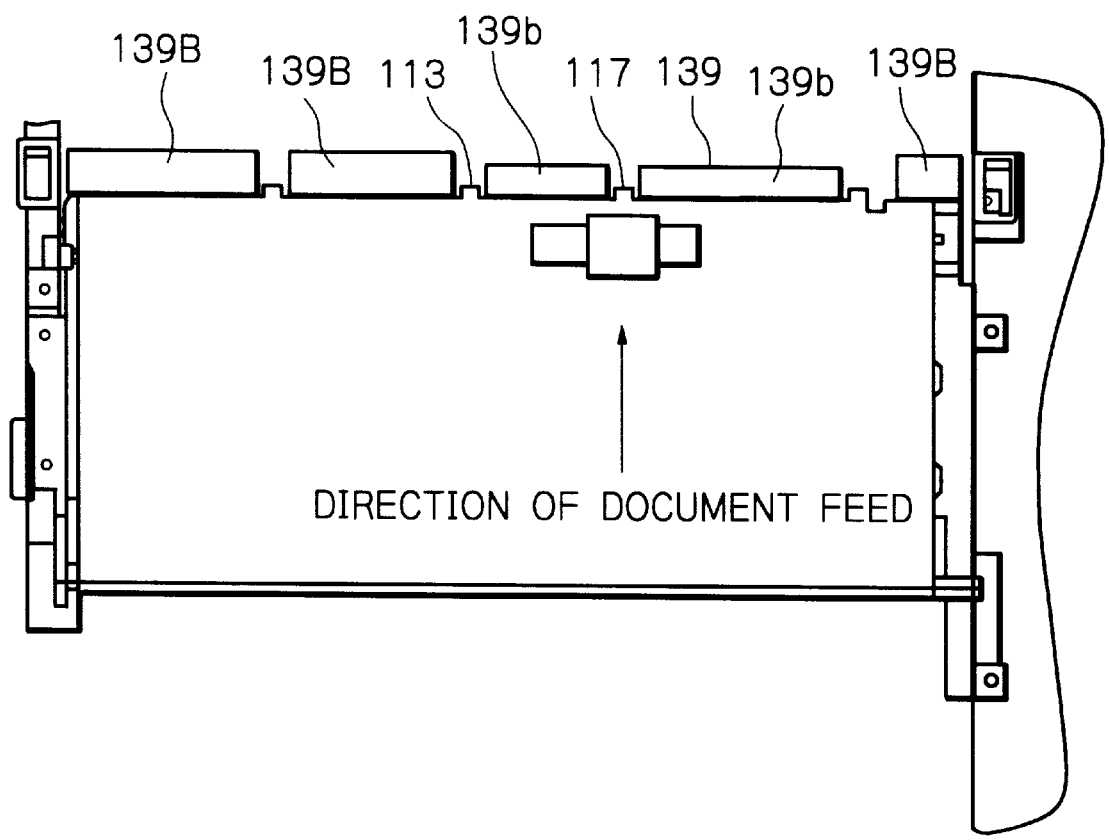
FIG. 15 is a plan view of the document setting section shown in FIG. 14.

FIGS. 14 and 15 show a document setting portion included in the feeding section 100. As shown, the document setting portion includes a table 112 including a bottom plate 113, and an abutment member constructed integrally with a stay 139. The abutment member includes abutment surfaces 139A and inclined guide surfaces 139B and 139b. The abutment member extends perpendicularly to the direction of document feed such that documents abut against it when set on the table.

In the illustrative embodiment, documents are set on the table 112, including the bottom plate 113, with their image surfaces or fronts facing upward. The stay 139 is mounted to the opposite side walls, not shown, of the DF 1 at opposite ends thereof (see FIG. 15). The bottom plate 113 is mounted on the stay 139 and rotatable up and down about a fulcrum 138 (arrows a and b) by being driven by an elevation motor not shown. At least a part of the bottom plate 113 extends over the abutment member in the direction of document feed for the same purpose as stated in relation to the conventional DF of FIG. 11. A set sensor 115 and a feeler 114 are arranged on the bottom plate 113 and movable up and down together with the bottom plate 113. The set sensor 115 is responsive to documents set on the table 112. The feeler 114 is used to determine whether or not the documents are caused to abut against the abutment member. A bottom plate sensor 116 is mounted on the stay 139 in order to determine whether or not the bottom plate 113 is located at a preselected position.

The stay 139 with the abutment surface 139A and guide surfaces 139B and 139b additionally includes an abutment surface (corresponding to 139a shown in FIG. 16) different in height from the abutment surfaces 139A. The abutment member is positioned in the vicinity of a nip between a belt 119 and a reverse roller 120. The guide surfaces 139B and 139b guide a document being transferred from the bottom plate 113 to an upper document guide 151 which extends toward the above nip.

The abutment member has at least two different heights, i.e., it is high in the center portion adjoining the pick-up roller or feeding means 117, but low at opposite side edge portions. More specifically, the abutment surface is higher in its portion expected to contact the center portion of the leading edge of a document fed by the pick-up roller 117 (corresponding to the surface 139a, FIG. 6) than in its portions expected to contact the opposite side edge portions of the document (corresponding to the surfaces 139A).

The guide surfaces 139B and 139b each is inclined by a particular angle. For example, when abutment surfaces having two different heights are provided, the guide surface 139b having a greater inclination is combined with the higher abutment surface (corresponding to the surface 139a, FIG. 16) while the guide surfaces 139B having a smaller inclination are combined with the lower abutment surfaces (corresponding to the surfaces 139A). In this configuration, the center portion of the leading edge of a document having a back curl easily gets over the abutment member because it is straightened by the weight of the pick-up roller 117, as stated earlier. Even the side edge portions of the above edge hanging down. easily get over the abutment member because they abut against the end portions (abutment surfaces 139a and guide surfaces 139B) of the abutment member lower and less inclined than the center portion.

Figure 16:
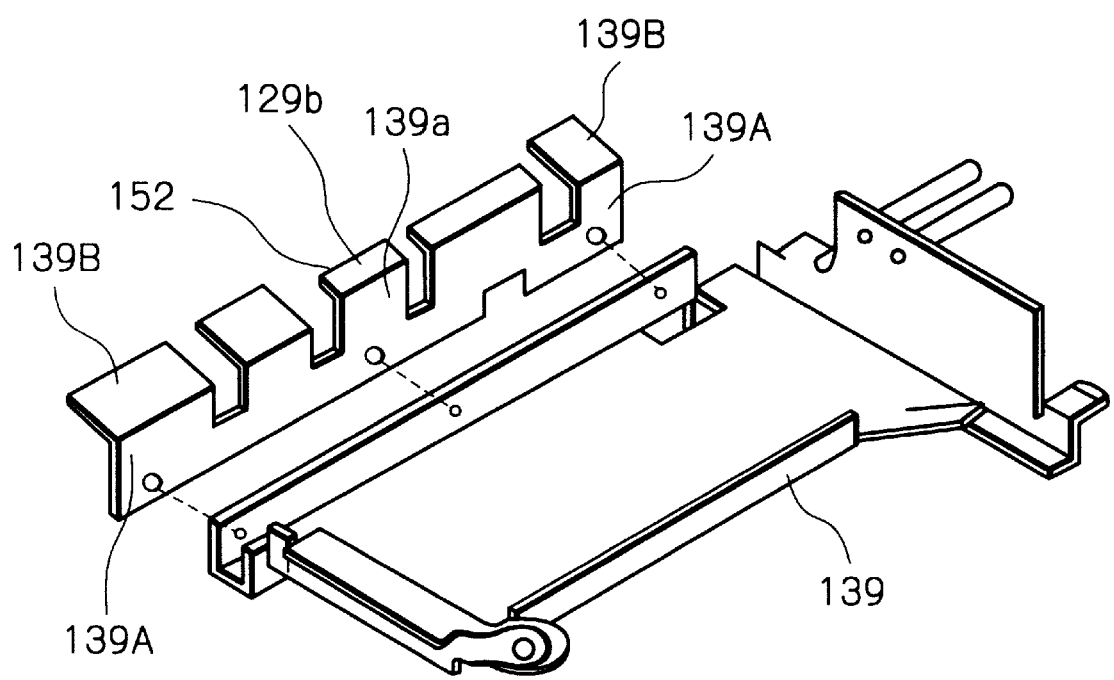
FIG. 16 shows an abutment member included in the fourth embodiment.

In the illustrative embodiment, the abutment member is constructed integrally with the stay 139. Alternatively, as shown in FIG. 16, an abutment member 152 having the abutment surfaces 139A and 139a, including the guide surfaces 139B and 139b, may be fastened to the stay 139 by screws or similar fastening means, so that the member 152 can be removed from the stay 139. Further, a part of the abutment member 152 may be implemented as a separable member. In addition, a plurality of abutment members 152 each having the abutment surfaces 139A and 139b of particular heights and guides 139B and 139b of particular inclinations may be prepared in order to accommodate various kinds of curls and various kinds of papers. This is successful to save the replacement cost.

When the DF 1 is not in operation, a pick-up motor causes a lever to lift the pick-up roller 117 via a cam in a direction indicated by an arrow c, although not shown specifically. When the operator sets documents on the bottom plate 113 and then presses the copy start button, the bias of the lever acting on the pick-up roller 117 in the direction c is cancelled. As a result, the pick-up roller 117 is lowered due to its own weight in a direction indicated by an arrow d. Subsequently, the bottom plate 113 is raised and, in turn, raises the pick-up roller 117 contacting the top of the document stack. A sensor 118 senses the height of the pick-up roller 117 and thereby determines the raised position of the bottom plate 113. That is, the sensor 118 senses the level of the top document present on the bottom plate 113 and thereby determines an adequate position for paying out the top document. The pick-up roller 117 is rotated in the direction of document feed by the pick-up motor mentioned earlier.

The belt 119 included in the feeding section 110 is driven by the feed motor in the direction of paper feed while a reverse roller 120 is driven by the feed motor in the direction opposite to the above direction. The reverse roller 120 reverses the documents underlying the top document, so that only the top document is fed. A pull-out roller 121 is driven by the feed motor to convey the document fed by the belt 119 to a registration roller 123. A pull-out sensor 122 senses the document being conveyed by the pull-out roller 121 and is implemented by an optical reflection type sensor. In addition, the pull-out sensor 122 senses the leading edge and trailing edge of the document, so that the length of the document can be determined on the basis of the number of pulses applied to the feed motor. The registration roller 123 is also driven by the feed motor in order to drive the document to a glass platen 141. A registration sensor 125 is an optical reflection type sensor responsive to the document being conveyed by the registration roller 123. The registration sensor 125 plays the role of a timing sensor for stopping the movement of the document at the glass platen 141.

In the conveying section 200, an endless belt 127 is passed over a drive roller 126 and formed of rubber or cloth. The drive roller 126 is driven by the conveyance roller in order to move the belt 127. The belt 127 is held with contact with a document scale 142 and the glass platen 141. When the document is brought to the belt 127 and glass platen 141 contacting each other, the belt 127 and platen 141 convey it therebetween due to a difference in the coefficient of friction between the glass platen 141 and document and the belt 127 and document.

The document scale 142 is slightly higher in level than the upper surface of the glass platen 141. A document stack is abutted against the document scale 142 at its one edge, so that document images can be read in accurate registration. A scanner 140 is built in a scanner unit included in the copier body. By scanning the glass platen 125 from below, the scanner 140 reads image data with a CCD image sensor or similar image sensor. Specifically, the scanner 140 is driven by a scanner motor, not shown, to move along the document positioned on the glass platen 141.

In the discharging section 300, a sensor 128 is responsive to the document conveyed by the belt 127 and implemented by an optical reflection type sensor. An inlet roller 128, a simplex mode roller 130 and a duplex mode roller 135 are driven by the discharge motor. A sensor 132 is also an optical reflection type sensor and used as a trigger for controlling a path selector 131 at the time of turn-over and at the time of discharge in a duplex copy mode. In addition, the sensor 132 is used as a trigger for controlling another path selector 134 at the time of discharge or turn-over in the duplex copy mode. A simplex mode tray 137 is mounted on the copier body (right-hand side in FIG. 13) and receives documents in a simplex copy mode. A duplex mode tray 136 is positioned below the table 112 in order to receive documents in the duplex copy mode.

In operation, assume that the operator selects the simplex copy mode, sets documents on the table 112, and then presses the copy start button. Then, the feed motor is rotated clockwise (forward direction) and causes the pick-up roller 117, belt 119 and pull-out roller 121 to rotate in the same direction while causing the reverse roller 120 to rotate in counterclockwise (reverse direction). The pick-up roller 117 lowered in the direction d, as stated earlier, pays out the top document from the table 112. The top document is separated from the underlying documents by the cooperation of the belt 119 and reverse roller 120 and pulled out by the pull-out roller 121.

The document conveyed by the pull-out roller 121 is brought to the registration roller 123 after having its trailing edge sensed by the pull-out sensor 122. In response to the resulting output of the registration sensor 125, the feed motor is reversed. At the same time, a driveline, not shown, causes the pick-up roller 121 to rotate in the forward direction and causes the reverse roller 120 to rotate in the reverse direction. As a result, the document is conveyed from the pull-out roller 121 to the registration roller 123, but the next document is prevented from entering the nip between the belt 119 and the reverse roller 120. The conveyance motor is caused to rotate forward at the same time as the feed motor is reversed, so that the document is conveyed to the glass platen 141 by the belt 127. At this instant, after the registration sensor 125 has sensed the trailing edge of the document, the conveyance motor is further driven by a preselected number of pulses and then deenergized. Consequently, the movement of the document is accurately stopped on the glass platen 141. After the document on the glass platen 141 has been read by the scanner 140, the conveyance motor is reversed in order to cause the belt 127 to convey the document to the discharging section 300.

In the discharging section 300, the discharge motor is reversed at the same time as the conveyance motor. The document is therefore driven out to the tray 300 without being turned over. Specifically, in a simplex copy mode, a turn solenoid, not shown, switches the path selector 131 such that the path selector 131 steers the document in a direction indicated by an arrow. As a result, the document is driven out to the simplex mode tray 137 by the rollers 128 and 130. The sheet feed operation described above is also executed in the duplex copy mode.

In the duplex copy mode, the path selector 131 is so positioned as to steer the document in a direction indicated by an arrow f. At the same time, the path selector 134 is so positioned as to steer the document in a direction indicated by an arrow h by the turn solenoid. In this condition, the document is conveyed by the roller 128 toward the glass platen 141 while being turned upside down. After an image on the other side or rear of the document has been read by the scanner 140, the document is again conveyed from the conveying section 200 to the discharging section 300.

The document entered the discharging section 300 upside down is driven out to the duplex mode tray 136; should the document be driven out to the simplex mode tray 137, its pages would be reversed in order. Specifically, the path selector 131 is caused to select the direction f while the path selector is caused to select a direction indicated by an arrow g. In this condition, the document is conveyed to the duplex mode tray 136 via a turn guide 133 and a roller 135.

As stated above, in the illustrative embodiment, the portion of the abutment surface expected to contact the center portion of the leading edge of a document, i.e., the abutment surface 139*a* is higher in level than the abutment surfaces 139A expected to contact the opposite end portions of the above leading edge. In this configuration, even when a document has a greater back curl at opposite sides than at the center, the opposite sides can easily get over the abutment member. This prevents the opposite sides of the document from bringing about troubles including folding when passing through the abutment member.

Further, the guide surfaces 139B and 129*b* extending form the upper ends of the abutment surfaces 139A and 139*a*, respectively, each has a particular inclination matching with the height of the associated abutment surface; in the illustrative embodiment, the guide surface 129*b* has a greater inclination angle than the guide surfaces 139B. Therefore, the opposite sides of the document curled more than the center abut against the guide surfaces with the small inclination and can therefore easily get over such guide surfaces. This also prevents the opposite sides of the document from folding when passing through the abutment member.

Moreover, at least a part of the abutment member 152 is implemented as a separable member and can be replaced in accordance with the degree of the back curl of documents to be dealt with. This promotes efficient assembly while saving the replacement cost of parts.

In addition, at least a part of the bottom plate 113 extends in the direction of document feed over the abutment surfaces 139A and 139*a*. Such an extension prevents a soft document or a document with a back curl hanging down at the leading edge from entering the gap between the bottom plate 113 and the abutment member.

Various modifications will become possible for those skilled in the art after receiving the teachings of the present disclosure without departing from the scope thereof.

What is claimed is:

1. A document feeder comprising:

a table to be loaded with a stack of documents;

an abutment member against which a leading edge of the stack of documents abuts when said stack is set on said table; and feeding means for sequentially feeding the stack of documents stacked on said table;

wherein a part of said abutment member is variable in height in accordance with a degree of a back curl of the documents to be fed.

2. A document feeder comprising:

a table configured to hold a stack of documents;

an abutment member against which a leading edge of the stack of documents abuts when said stack is set on said table; and a feeder configured to feed sequentially the stack of documents stacked on said table, wherein a part of said abutment member is variable in height in accordance with a degree of a back curl of the documents to be fed.

3. A document feeder comprising:

a table to be loaded with a stack of documents;

a pick-up roller for paying out a top one of the documents stacked on said table; and an abutment member extending perpendicularly to a direction of document feed such that a leading edge of the stack of documents in a direction of document feed abuts said abutment member when set on said table;

wherein said abutment member has an abutment surface having a particular height at each of a portion expected to contact a center portion of the leading edge of the document paid out by said pick-up roller and a portion expected to contact opposite end portions of said leading edge.

4. A document feeder as claimed in claim 3, wherein inclined surfaces each having an inclination matching with a respective one of said portions of said abutment surface extend out from a top of said abutment surface.

5. A document feeder as claimed in claim 4, wherein at least a part of said abutment member is implemented as a separable member.

6. A document feeder as claimed in claim 5, further comprising a bottom plate for raising the stack of documents set on said table and at least partly extending in the direction of document feed over said abutment surface.

7. A document feeder comprising:

a table configured to hold a stack of documents;

a pick-up roller configured to pay out a top one of the documents stacked on said table; and an abutment member extending perpendicularly to a direction of document feed such that a leading edge of the stack of documents in a direction of document feed abuts said abutment member when set on said table;

wherein said abutment member has an abutment surface having a particular height at each of a portion expected to contact a center portion of the leading edge of the document paid out by said pick-up roller and a portion expected to contact opposite end portions of said leading edge.

8. A document feeder, comprising: an input device configured to receive a feed start signal and a mode of operation designation from an operator;

a stacking device configured to hold a stack of documents;

a sensor configured to sense the stack of documents set on said stacking device;

a motor configured to raise the stacking device such that a leading edge portion of the stack of documents is raised to a preselected position; and a controller configured to start said motor to raise the leading edge portion of the stack of documents at a time dependent on the mode of operation designated by the operator.

9. A document feeder, comprising:

input means for receiving a feed start signal and a mode of operation designation from an operator;

stacking means for holding a stack of documents;

document sensing means for sensing the stack of documents set on said stacking means;

document raising means for raising the stacking means such that a leading edge portion of the stack of documents is raised to a preselected position; and control means for starting said document raising means to raise the leading edge portion of the stack of documents at a time dependent on the mode of operation designated by the operator.

10. A document feeder, comprising:

a stacking device configured to hold a stack of documents;

a sensor configured to sense the stack of documents set on said stacking device;

a conveyor configured to convey the stack of documents to an image reading section;

a feeder connected to said stacking device and configured to take sequentially the stack of documents set on said stacking device and to feed the stack of documents to said conveyor; and an abutment member configured to abut the set of documents set on said stacking device against a feed portion of said feeder in response to said sensor sensing the stack of documents.

11. A document feeder as claimed in claim 10, wherein said abutment member causes the stack of documents to abut against said feeding portion on the elapse of a preselected period of time after said sensor has sensed the documents.

12. A document feeder as claimed in claim 11, further comprising a time setting device configured to set the preselected period of time wherein said abutment device causes said stack of documents to abut against said feeding portion on the elapse of said period of time.

13. A document feeder as claimed in claim 10, further comprising a control panel having an abutment command and configured to cause said abutment member to bring the documents into abutment against said feeding portion in response to an operator enabling said abutment command after said sensor has sensed said documents.

14. A document feeder, comprising:

stacking means for holding a stack of documents;

sensing means for sensing the stack of documents set on said stacking means;

conveying means for conveying the stack of documents to an image reading section;

feeding means connected to said stacking means and for taking sequentially the stack of documents set on said stacking means and for feeding the stack of documents to said conveying means; and abutting means for abutting the set of documents set on said stacking means against a feed portion of said feeding means in response to said sensing means sensing the stack of documents.

15. A document feeder, comprising:

a stacking device configured to hold a stack of documents;

a sensor configured to sense the stack of documents set on said stacking device;

a conveyor configured to convey the stack of documents to an image reading section configured to read the documents;

a feeder connected to said stacking device and configured to take sequentially the stack of documents set on said stacking device and to feed the stack of documents to said conveyor; and a motor configured to raise the stacking device such that a leading edge portion of the stack of documents is raised to a preselected position, wherein said stacking device is lowered to a lowermost position at the time of power-up.

16. A document feeder, comprising:

stacking means for holding a stack of documents;

document sensing means for sensing the stack of documents set on said stacking means;

conveying means for conveying the stack of documents to an image reading section for reading the documents;

feeding means connected to said stacking means and for taking sequentially the stack of documents set on said stacking means and for feeding the stack of documents to said conveying means; and document raising means for raising the stacking device such that a leading edge portion of the stack of documents is raised to a preselected position, wherein said stacking means is lowered to a lowermost position at the time of power-up.

17. A document feeder comprising:

inputting means for receiving a feed start signal;

stacking means to be loaded with a stack of documents;

document sensing means for sensing the stack of documents set on said stacking means;

picking means contacting a top one of the documents stacked on said stacking means for picking up the top document;

document raising means for raising a leading edge portion of the stack of documents with respect to a direction of document feed to a preselected position; and control means for causing said document raising means to operate in either one of a first mode for raising said document raising means as soon as said document sensing means senses the documents, and a second mode for raising, after said document sensing means has sensed said documents, said document raising means when said inputting means receives the feed start signal.

18. A document feeder comprising:

an input device configured to receive a feed start signal;

a stacking device configured to hold a stack of documents;

a sensor configured to sense the stack of documents set on said stacking device;

a pick-up roller contacting a top one of the documents stacked on said stacking device and configured to pick up the top document;

a motor configured to raise a leading edge portion of the stack of documents with respect to a direction of document feed to a preselected position; and a controller configured to cause said motor to operate in either one of a first mode for raising said documents as soon as said sensor senses the documents, and a second mode for raising the documents after said sensor has sensed said documents and upon said input device receiving the feed start signal.

19. A document feeder mounted on an image forming apparatus including lifting means for lifting up said document feeder, said document feeder comprising:

inputting means for receiving a feed start signal;

stacking means to be loaded with a stack of documents;

document sensing means for sensing the stack of documents set on said stacking means;

picking means contacting a top one of the documents stacked on said stacking means for picking up the top document;

document raising means for raising a leading edge portion of the stack of documents with respect to a direction of document feed to a preselected position where the top document contacts said picking means;

lift-up sensing means for sensing a lift-up of said document feeder effected by said lifting means;

first control means for raising, in a first mode selected on said image forming apparatus, said document raising means when said document sensing means senses the documents and holding, when said lift-up sensing means senses the lift-up later, said document raising means at a raised position; and second control means for raising, in a second mode selected on said image forming apparatus, said document raising means when said inputting means receives the feed start signal after said document sensing means has sensed the documents.

20. A document feeder as claimed in claim 19, wherein said second control means raises said document raising means when said lift-up sensing means senses the lift-up after said document sensing means has sensed the documents, but before said inputting means receives the feed start signal.

21. A document feeder mounted on an image forming apparatus including a hinge configured to lift up said document feeder, said document feeder comprising:

an input device configured to receive a feed start signal;

a stacking device configured to hold a stack of documents;

a sensor configured to sense the stack of documents set on said stacking device;

a pick-up roller contacting a top one of the documents stacked on said stacking device and configured to pick up the top document;

a motor configured to raise a leading edge portion of the stack of documents with respect to a direction of document feed to a preselected position where the top document contacts said pick-up roller;

a second sensor configured to sense when said document feeder is lifted by said hinge;

a first controller configured to control said motor to raise the stack of documents when said sensor senses the documents, and to control said motor to hold the stack of documents at a raised position when said second sensor senses said document feeder has been lifted in response to a first mode being selected on said image forming apparatus; and a second controller configured to control said motor to raise the documents when said input device receives the feed start signal after said sensor has sensed the documents in response to a second mode being selected on said image forming apparatus.

22. A document feeder comprising:

stacking means to be loaded with a stack of documents;

document sensing means for sensing the stack of documents set on said stacking means;

document raising means for raising a leading edge portion of the stack of documents with respect to a direction of document feed to a preselected position where the top document contacts picking means;

feeding means connected to said stacking means for sequentially taking the documents stacked on said stacking means while feeding said documents;

conveying means connected at one end to said feeding means for conveying each document fed from said feeding means to an image reading section for reading said document; and jam sensing means for sensing a document jam;

said document raising means being lowered to a lowermost position when said jam sensing means senses a document jam.

23. A document feeder comprising:

a stacking device configured to hold a stack of documents;

a sensor configured to sense the stack of documents set on said stacking device;

a motor configured to raise a leading edge portion of the stack of documents with respect to a direction of document feed to a preselected position where the top document contacts a pick-up roller;

a feeding device connected to said stacking device and configured to take sequentially the documents stacked on said device while feeding said documents;

a conveyor connected at one end to said feeding device and configured to convey each document fed from said feeding device to an image reading section configured to read said document; and a second sensor configured to sense a document jam, wherein said motor lowers said documents to a lowermost position when said second sensor senses a document jam.

24. A document feeder comprising:

stacking means to be loaded with a stack of documents;

document sensing means for sensing the stack of documents set on said stacking means;

document raising means for raising a leading edge portion of the stack of documents with respect to a direction of document feed to a preselected position where the top document contacts picking means;

feeding means connected to said stacking means for sequentially taking the documents stacked on said stacking means while feeding said documents;

conveying means connected at one end to said feeding means for conveying each document fed from said feeding means to an image reading section for reading said document; and mode setting means for allowing either one of an ADF (Automatic Document Feeder) mode for automatically sequentially feeding the documents stacked on said stacking means and an SADF (Semi Automatic Document Feeder) mode for automatically feeding a single document every time said single document is laid on said stacking means;

wherein in said ADF mode said document raising means is lowered to a lowermost position when said document sensing means senses absence of the documents while, in said SADF mode, said document rasing means is lowered to an intermediate position between a document feed position and said lowermost position when said document sensing means senses absence of the documents.

25. A document feeder comprising:

a stacking device configured to hold a stack of documents;

a sensor configured to sense the stack of documents set on said stacking means;

a motor configured to raise a leading edge portion of the stack of documents with respect to a direction of document feed to a preselected position where the top document contacts a pick-up roller;

a feeding device connected to said stacking device and configured to take sequentially the documents stacked on said stacking device while feeding said documents;

a conveyor connected at one end to said feeding device and configured to convey each document fed from said feeding device to an image reading section configured to read said document; and a controller configured to allow either one of an ADF (Automatic Document Feeder) mode for automatically sequentially feeding the documents stacked on said stacking device or an SADF (Semi Automatic Document Feeder) mode for automatically feeding a single document every time said single document is laid on said stacking device, wherein in said ADF mode said motor lowers the stacking device to a lowermost position when said sensor senses absence of the documents, and in said SADF mode said motor lowers the stacking device to an intermediate position between a document feed position and said lowermost position when said sensor senses absence of the documents.

26. A document feeding method, comprising the steps of:

sensing a stack of documents loaded on a stacking device;

receiving a feed start signal and a mode of operation designation from an operator; and raising a leading edge portion of the stack of documents to a preselected position at a time dependent on the mode of operation designated by the operator.

27. A document feeding method, comprising the steps of:

stacking a stack of documents in a stacking device;

sensing the stack of documents set on said stacking device;

abutting the set of documents set on said stacking device against a feed portion of a feeder connected to said stacking device in response to sensing the stack of documents;

taking sequentially the stack of documents set on said stacking device and feeding the stack of documents to a conveyor; and conveying the stack of documents to an image reading section.

28. A document feeding method practicable with a document feeder inputting means for receiving a feed start signal, stacking means to be loaded with a stack of documents, document sensing means for sensing the stack of documents set on said stacking means, picking means contacting a top one of the documents stacked on said stacking means for picking up the top document, and document raising means for raising a leading edge portion of the stack of documents with respect to a direction of document feed to a preselected position, said document feeding method comprising the steps of:

sensing the documents set on said stacking means;

receiving the feed start signal via said inputting means; and causing said document raising means to operate either one of a first mode for raising said document raising means as soon as said document sensing means senses the documents, and a second mode for raising, after said document sensing means has sensed the documents, said document raising means when said inputting means receives the feed start signal.

29. A document feeding method practicable with a document feeder including inputting means for receiving a feed start signal, stacking means to be loaded with a stack of documents, document sensing means for sensing the stack of documents set on said stacking means, picking means contacting a top one of the documents stacked on said stacking means for picking up the top document, document raising means for raising a leading edge portion of the stack of documents with respect to a direction of document feed to a preselected position where the top document contacts said picking means, and lift-up sensing means for sensing a lift-up of said document feeder effected by said lifting means, said document feeding method comprising:

sensing the documents set on said stacking means;

receiving the feed start signal via said inputting means;

raising, in a first mode selected on said image forming apparatus, said document raising means when said document sensing means senses the documents and holding, when said lift-up sensing means senses the lift-up later, said document raising means at a raised position; and raising, in a second mode selected on said image forming apparatus, said document raising means when said inputting means receives the feed start signal after said document sensing means has sensed the documents.

30. A method as claimed in claim 29, wherein in said second mode said document raising means is raised when said lift-up sensing means senses the lift-up after said document sensing means has sensed the documents, but before said inputting means receives the feed start signal.

* * * * *